(12) United States Patent
Noguchi et al.

(10) Patent No.: US 8,484,413 B2
(45) Date of Patent: Jul. 9, 2013

(54) RECORDING MEDIUM STORING CONTROL PROGRAM FOR DECENTRALIZED DATA, STORAGE MANAGEMENT PROGRAM, CONTROL NODE, AND DISK NODE

(75) Inventors: Yasuo Noguchi, Kawasaki (JP); Hideki Sakurai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 12/570,556

(22) Filed: Sep. 30, 2009

(65) Prior Publication Data

US 2010/0138604 A1 Jun. 3, 2010

(30) Foreign Application Priority Data

Dec. 1, 2008 (JP) ................................. 2008-305960

(51) Int. Cl.
*G06F 12/00* (2006.01)
(52) U.S. Cl.
USPC .......................................... 711/114; 711/162
(58) Field of Classification Search
USPC ................................................ 711/114, 162
See application file for complete search history.

(56) References Cited

U.S. PATENT DOCUMENTS

| | | | | |
|---|---|---|---|---|
| 6,526,478 | B1 * | 2/2003 | Kirby | 711/114 |
| 2005/0102551 | A1 * | 5/2005 | Watanabe | 714/5 |
| 2005/0144380 | A1 * | 6/2005 | Suzuki et al. | 711/113 |
| 2005/0235109 | A1 * | 10/2005 | Ogihara et al. | 711/114 |
| 2006/0010290 | A1 * | 1/2006 | Sasamoto | 711/114 |
| 2009/0113124 | A1 * | 4/2009 | Kataoka et al. | 711/112 |

FOREIGN PATENT DOCUMENTS

WO 2004/104845 12/2004

* cited by examiner

*Primary Examiner* — Hashem Farrokh
(74) *Attorney, Agent, or Firm* — Staas & Halsey LLP

(57) ABSTRACT

A number-of-slices collector collects number-of-slices information indicating the number of free slices, which are not assigned to a storage areas of a logical disk, from each of a plural disk nodes, divides the storage area of the corresponding storage device in units of slice, and stores an assignment relation of the slices with respect to the storage areas of the logical disk. A disk node selector selects a source disk node from among the disk nodes having the free slices, and requests a slice identifier to identify the free slice for the selected source disk node. The source disk node serves as a source providing the slice to be assigned. A slice assigner receives the slice identifier from the source disk node, and determines an assignment relation of the free slice, which is denoted by the received slice identifier, with respect to the storage areas of the logical disk.

3 Claims, 23 Drawing Sheets

FIG. 7

SLICE INFORMATION STORAGE 120

| LOGICAL DISK ID | ADDRESS | TYPE | DISK NODE ID | SLICE ID | MIRROR DISK NODE ID | MIRROR SLICE ID |
|---|---|---|---|---|---|---|
| L1 | A1 | P | DP1 | SL1 | DP3 | SL2 |
| L1 | A2 | S | DP1 | SL2 | DP2 | SL1 |
| – | – | F | DP1 | SL3 | – | – |
| ... | ... | ... | ... | ... | ... | ... |
| – | – | F | DP1 | SL700 | – | – |

| DISK NODE ID | NUMBER OF PRIMARY SLICES | NUMBER OF SECONDARY SLICES | NUMBER OF FREE SLICES | NUMBER OF SINGLE PRIMARY SLICES | NUMBER OF RESERVE SLICES |
|---|---|---|---|---|---|
| DP1 | 100 | 101 | 499 | 0 | 0 |
| DP2 | 101 | 99 | 500 | 0 | 0 |
| DP3 | 101 | 102 | 497 | 0 | 0 |

NUMBER-OF-SLICES STORAGE

FIG. 12

SLICE ASSIGNMENT INFORMATION STORAGE 520

521

| LOGICAL DISK ID | ADDRESS | TYPE | DISK NODE ID | TEMPORARY SLICE ID | MIRROR DISK NODE ID | TEMPORARY MIRROR SLICE ID |
|---|---|---|---|---|---|---|
| L2 | A1 | P | DP1 | a | DP2 | e |
| L2 | A2 | P | DP2 | b | DP3 | f |
| L2 | A3 | P | DP3 | c | DP1 | d |
| L2 | A3 | S | DP1 | d | DP3 | c |
| L2 | A1 | S | DP2 | e | DP1 | a |
| L2 | A2 | S | DP3 | f | DP2 | b |

FIG. 13

| DISK NODE ID | SLICE ID |
|---|---|
| DP1 | SL3 |
| DP1 | SL4 |
| DP2 | SL3 |
| DP2 | SL4 |
| DP3 | SL3 |
| DP3 | SL4 |

FIG. 14

SLICE ASSIGNMENT INFORMATION STORAGE 520

| LOGICAL DISK ID | ADDRESS | TYPE | DISK NODE ID | SLICE ID | MIRROR DISK NODE ID | MIRROR SLICE ID |
|---|---|---|---|---|---|---|
| L2 | A1 | P | DP1 | SL3 | DP2 | SL4 |
| L2 | A2 | P | DP2 | SL3 | DP3 | SL4 |
| L2 | A3 | P | DP3 | SL3 | DP1 | SL4 |
| L2 | A1 | S | DP1 | SL4 | DP3 | SL3 |
| L2 | A2 | S | DP2 | SL4 | DP1 | SL3 |
| L2 | A3 | S | DP3 | SL4 | DP2 | SL3 |

SLICE ASSIGNMENT INFORMATION STORAGE 520

| LOGICAL DISK ID | ADDRESS | TYPE | DISK NODE ID | SLICE ID | MIRROR DISK NODE ID | MIRROR SLICE ID |
|---|---|---|---|---|---|---|
| L1 | A1 | P | DP1 | SL1 | DP3 | SL2 |
| L1 | A2 | P | DP2 | SL1 | DP1 | SL2 |
| L1 | A3 | P | DP3 | SL1 | DP2 | SL2 |

SLICE INFORMATION STORAGE 120

| LOGICAL DISK ID | ADDRESS | TYPE | DISK NODE ID | SLICE ID | MIRROR DISK NODE ID | MIRROR SLICE ID |
|---|---|---|---|---|---|---|
| L1 | A1 | SP | DP1 | SL1 | – | – |
| L1 | A2 | S | DP1 | SL2 | DP2 | SL1 |
| – | – | F | DP1 | SL3 | – | – |
| ... | ... | ... | ... | ... | ... | ... |
| – | – | F | DP1 | SL700 | – | – |

| LOGICAL DISK ID | ADDRESS | TYPE | DISK NODE ID | SLICE ID | MIRROR DISK NODE ID | MIRROR SLICE ID |
|---|---|---|---|---|---|---|
| L1 | A1 | SP | DP1 | SL1 | - | - |
| L1 | A3 | SP | DP2 | SL2 | - | - |

FIG. 23

SLICE ASSIGNMENT INFORMATION STORAGE 520

523

| LOGICAL DISK ID | ADDRESS | TYPE | DISK NODE ID | SLICE ID | MIRROR DISK NODE ID | MIRROR SLICE ID |
|---|---|---|---|---|---|---|
| L1 | A1 | SP | DP1 | SL1 | DP2 | a |
| L1 | A3 | SP | DP2 | SL2 | DP1 | b |
| L1 | A1 | R | DP2 | a | DP1 | SL1 |
| L1 | A3 | R | DP1 | b | DP2 | SL2 |

FIG. 24

| DISK NODE ID | SLICE ID |
|---|---|
| DP1 | SL3 |
| DP2 | SL3 |

FIG. 25

SLICE ASSIGNMENT INFORMATION STORAGE 520

522

| LOGICAL DISK ID | ADDRESS | TYPE | DISK NODE ID | SLICE ID | MIRROR DISK NODE ID | MIRROR SLICE ID |
|---|---|---|---|---|---|---|
| L1 | A1 | P | DP1 | SL1 | DP2 | SL3 |
| L1 | A2 | P | DP2 | SL1 | DP1 | SL2 |
| L1 | A3 | P | DP2 | SL2 | DP1 | SL3 |
| L1 | A1 | R | DP2 | SL3 | DP1 | SL1 |
| L1 | A3 | R | DP1 | SL3 | DP2 | SL2 |

FIG. 26

| METADATA MANAGEMENT METHOD | STARTUP/FAILOVER | PREPARATION OF LOGICAL DISK | DELETION OF LOGICAL DISK | RECOVERY TO DUAL STATE |
|---|---|---|---|---|
| CENTRALIZED MANAGEMENT IN CONTROL NODE (α) | 1000000 | 2000 | 2000 | 1010000 |
| DECENTRALIZED MANAGEMENT USING DISK NODES (β) | 100 | 4000 | 100 | 40000 |
| REDUCTION RATE (β/α) | 1/10000 | 2 | 1/20 | 1/25 |

RECORDING MEDIUM STORING CONTROL PROGRAM FOR DECENTRALIZED DATA, STORAGE MANAGEMENT PROGRAM, CONTROL NODE, AND DISK NODE

CROSS-REFERENCE TO RELATED APPLICATIONS

This application is based upon and claims the benefit of priority of the prior Japanese Patent Application No. 2008-305960, filed on Dec. 1, 2008, the entire contents of which are incorporated herein by reference.

BACKGROUND

1. Field

The present invention relates to decentralized data control for use in a multi-node storage system.

2. Description of the Related Art

In a computer system, it is required to manage a large volume of data used by a large number of users. A multi-node storage system is known as one of systems for managing such a large volume of data.

The multi-node storage system is a storage system that is constructed by using a plurality of nodes (computers). The multi-node storage system includes, for example, an access node, a control node, and a plurality of disk nodes. The access node provides environments to users that are adapted for access to data stored in the disk nodes. The users can access the data stored in the disk nodes by delivering data access requests to the access node. The control node performs maintenance and management of the data provided in the multi-node storage system.

The control node manages, for example, the correspondence relationship between a virtually defined logical disk and a storage area in a storage device which is managed by each of the disk nodes. For such management, the disk node includes the storage device and manages a physical area of the storage device per unit area, called a "slice", partitioned into a certain size. Further, the control node divides the logical disk in units of segment and assigns a plurality of slices, which belong to different disk nodes, to each of the segments. Data can be decentralized by assigning slices, which belong to different disk nodes, for each of the plural segments constituting the logical disk.

The assigned slices are grouped into a primary slice for which the access node directly executes read/write, and a secondary slice for the purpose of mirroring the writing to the primary slice. In response to an access request for read/write including designation of a segment, the access node accesses the primary slice assigned to the designated segment. If the access request is a data write request, the disk node managing the primary slice transfers a copy of the written data to the secondary slice. As a result, data redundancy based on mirroring is ensured.

In the multi-node storage system described above, selection of the slice to be assigned to the segment of the logical disk is performed by the control node. Therefore, the control node is required to recognize the slice state in the storage device of each disk node. The slice state is mainly divided into a state in which the slice is assigned to the segment, and a state in which the slice is not assigned to the segment. The slice not assigned to the segment is called a "free slice".

Information regarding the slice state is held as metadata in the disk node. The control node collects the metadata from each disk node and recognizes the slice states in the entire system. Further, when the control node assigns the slice to the segment and cancels the assignment of the slice, the updated slice is reported to the disk node that manages the relevant slice. Transmission and reception of metadata are frequently performed between the control node and the disk node in order to manage the slice state by the control node as described above.

However, the known multi-node storage system experiences the problem that as the system scale increases, the control node has to handle a larger volume of metadata and a longer time is taken to collect the metadata. Particularly, at startup of the multi-node storage system, the control node is required to collect the metadata from all the disk nodes. Therefore, a startup time of the multi-node storage system is prolonged with an increase in volume of the metadata.

The control node is often prepared in a clustered structure to improve reliability. In that case, if the control node under the operation fails, the function of the control node is taken over by another node within the cluster (called "failover"). The other node taking over the function of the previous control node collects the metadata from all the disk nodes to confirm the states of all the slices, and then starts the operation as the control node. Accordingly, if the volume of metadata is extremely increased, a time required for the failover is prolonged and a service stop period is also prolonged.

The technique disclosed herein has been conceived in view of the above-described state of the art and is intended to reduce an amount of transferred information regarding the slice assignment relation.

SUMMARY

A control node executes a process of assigning storage areas of storage devices, which are connected respectively to a plurality of disk nodes, to storage areas of a virtually defined logical disk. A number-of-slices collector collects number-of-slices information indicating the number of free slices, which are not assigned to the storage areas of the logical disk, from each of the plural disk nodes, which divides the storage area of the corresponding storage device in units of slice, and which stores an assignment relation of the slices with respect to the storage areas of the logical disk, and stores the collected number-of-slices information in a number-of-slices storage. When a process requiring slice assignment to the storage areas of the logical disk is generated, a disk node selector refers to the number-of-slices storage, selects a source disk node from among the disk nodes having the free slices, which serves as a source providing the slice to be assigned, and requests a slice identifier to identify the free slice for the selected source disk node. A slice assigner receives the slice identifier from the source disk node, determines an assignment relation of the free slice, which is denoted by the received slice identifier, with respect to the storage areas of the logical disk, and notifies the determined assignment relation to the source disk node.

Additional aspects and/or advantages will be set forth in part in the description which follows and, in part, will be apparent from the description, or may be learned by practice of the invention.

The above-described embodiments of the present invention are intended as examples, and all embodiments of the present invention are not limited to including the features described above.

BRIEF DESCRIPTION OF THE DRAWINGS

FIG. 7 illustrates an exemplary data structure of a slice information storage;

FIG. 10 illustrates an exemplary data structure of a number-of-slices storage;

FIG. 12 illustrates an exemplary data structure of logical disk configuration information;

FIG. 13 illustrates a group of slice IDs obtained by the control node;

FIG. 14 illustrates an exemplary data structure of slice assignment information;

FIG. 18 illustrates slice assignment information after the metadata inquiry process at the startup of the access node;

FIG. 20 illustrates metadata updated by a process for change to a single primary slice;

FIG. 22 illustrates the result of a single primary slice inquiry;

FIG. 23 illustrates an exemplary data structure of a reserve assignment information table;

FIG. 24 illustrates the result of collecting free slice IDs;

FIG. 25 illustrates a slice assignment information table after update; and

FIG. 26 illustrates the result of comparing the amounts of transferred metadata between different metadata management methods.

DESCRIPTION OF THE EMBODIMENTS

Figure 1:
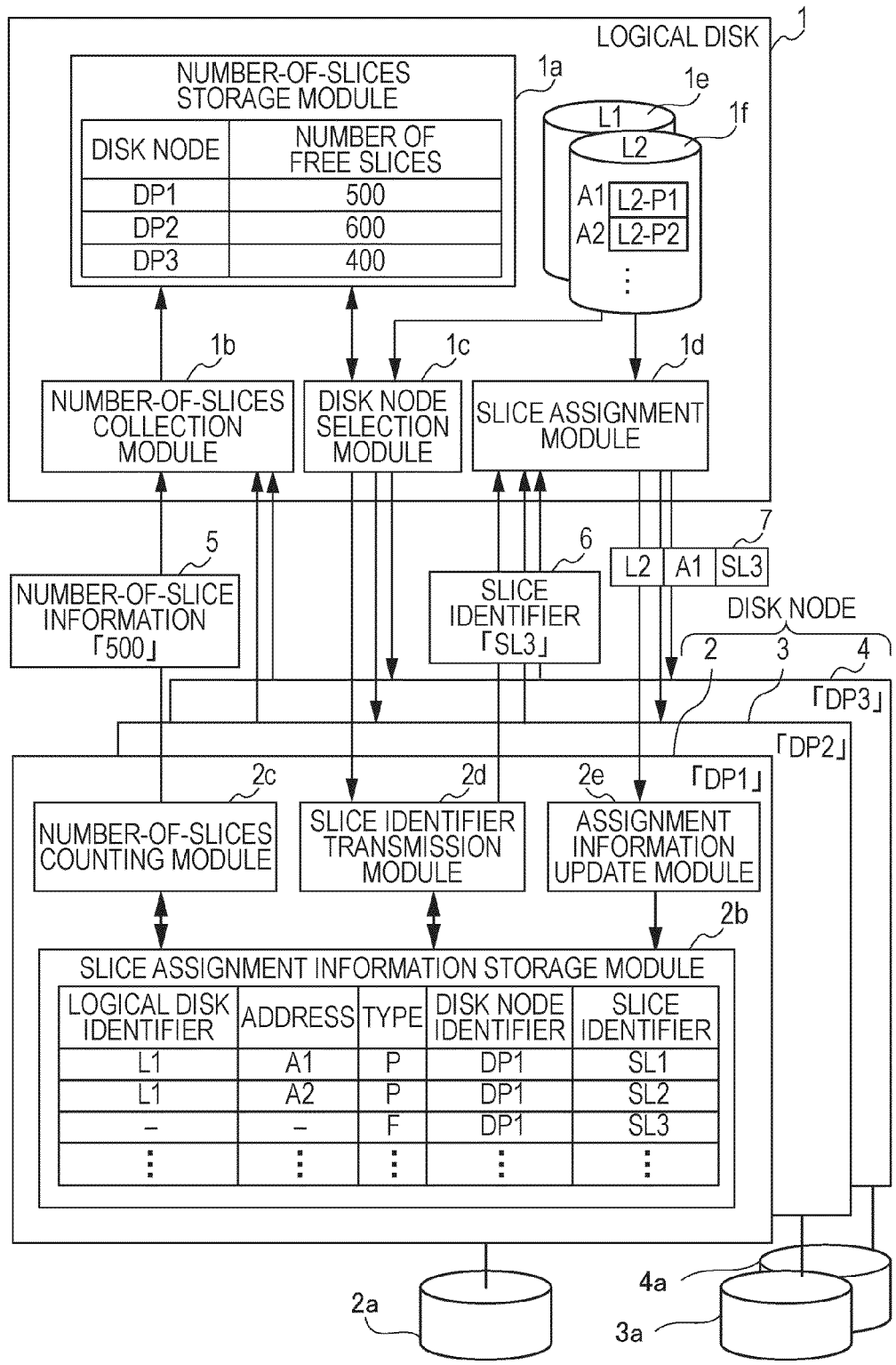
FIG. 1 is a block diagram illustrating an outline of an embodiment.

Reference may now be made in detail to embodiments of the present invention, examples of which are illustrated in the accompanying drawings, wherein like reference numerals refer to like elements throughout.

FIG. 1 illustrates an outline of an embodiment. A multi-node storage system is constituted by a control node 1 and a plurality of disk nodes 2, 3 and 4.

The control node 1 executes a process of assigning respective storage areas of storage devices 2a, 3a and 4a to storage areas of a logical disk 1e that is virtually defined. The storage devices 2a, 3a and 4a are connected respectively to the plurality of disk nodes 2, 3 and 4. To execute such an assignment process, the control node 1 includes a number-of-slices storage module 1a, a number-of-slices collection module 1b, a disk node selection module 1c, and a slice assignment module 1d.

The number-of-slices storage module 1a stores the number of free slices included in each of the disk nodes 2, 3 and 4. The term "free slice" implies a slice that is not assigned to the logical disk 1e.

The number-of-slices collection module 1b collects, from each of the plural disk nodes 2, 3 and 4, number-of-slices information 5 indicating the number of free slices which are not assigned to any storage areas of the logical disk 1e. Further, the number-of-slices collection module 1b stores the collected number-of-slices information 5 in the number-of-slices storage module 1a.

When a process of assigning a slice to a storage area of a logical disk 1f is generated, the disk node selection module 1c refers to the number-of-slices storage module 1a and selects, from among the disk nodes having free slices, a source disk node serving as a source that provides a slice as an assignment target. Further, the disk node selection module 1c requests, to the source disk node having been selected, a slice identifier 6 for identifying the free slice.

The slice assignment module 1d receives the slice identifier 6 from the source disk node and determines an assignment relation 7 of the slice, which is denoted by the received slice identifier 6, with respect to the storage area of the logical disk 1f. Further, the slice assignment module 1d notifies the determined slice assignment relation 7 to the disk nodes 2, 3 and 4.

The disk nodes 2, 3 and 4 manage respective storage areas of the storage devices 2a, 3a and 4a in the form divided in units of slice. The disk node 2 includes a slice assignment information storage module 2b, a number-of-slices counting module 2c, a slice identifier transmission module 2d, and an assignment information update module 2e.

The slice assignment information storage module 2b stores slice assignment information indicating the slice assignment relation with respect to the storage areas of the virtually defined logical disk 1e.

The number-of-slices counting module 2c refers to the slice assignment information storage module 2b and counts the number of free slices which are not assigned to any storage areas of the logical disk 1e. Further, the number-of-slices counting module 2c transmits number-of-slices information 5 indicating the number of free slices to the control node 1.

The slice identifier transmission module 2d transmits the slice identifier 6 for identifying the free slice to the control node 1 in response to a request from the control node 1.

When the slice assignment relation 7 with respect to the storage areas of the logical disk 1f is notified from the control node 1, the assignment information update module 2e updates the slice assignment information based on the notified slice assignment relation 7.

Each of the other disk nodes 3 and 4 have similar functions to those of the disk node 2.

In such a system, for example, the number-of-slices collection module 1b collects the number of free slices from each disk node when the control node 1 is started up. The number of free slices can be collected by transmitting a number-of-slices information request to each of the disk nodes 2, 3 and 4 from the number-of-slices collection module 1b. The number-of-slices counting module 2c of the disk node 2 counts the number of free slices in response to the number-of-slices information request. Then, the number-of-slices information 5 is transmitted from the number-of-slices counting module 2c to the control node 1. Similarly, the number-of-slices information is also transmitted from the disk nodes 3 and 4 to the control node 1. The number-of-slices collection module 1b stores the number-of-slices information having been transmitted from the disk nodes 2, 3 and 4 in the number-of-slices storage module 1a.

It is here assumed, for example, that a process of preparing the logical disk 1f is then executed in the control node 1. In this case, the disk node selection module 1c selects a source disk node from among the disk nodes having free slices. The source disk node serves as a source that provides a slice as an assignment target. In an example illustrated in FIG. 1, the disk node 2 is selected as the source disk node. Further, the disk node selection module 1c requests, to the disk node 2 which was selected, the slice identifier 6 for identifying the free slice. In response, the slice identifier transmission module 2d of the disk node 2 transmits, to the control node 1, the slice identifier 6 for identifying the free slice.

In the control node 1, the slice assignment module 1d receives the slice identifier 6 from the source disk node. The slice assignment module 1d then determines the assignment relation 7 of the slice, which is denoted by the received slice identifier 6, with respect to the storage areas of the logical disk 1f. Further, the slice assignment module 1d notifies the determined slice assignment relation 7 to the disk node 2. In the disk node 2, the assignment information update module 2e updates the slice assignment information based on the notified slice assignment relation.

Thus, while the slice assignment to the logical disk is determined by the control node 1, the information indicating the slice assignment relation can be held in each of the disk nodes 2, 3 and 4. Therefore, at the startup of the control node 1, it is no longer required to collect the slice assignment information from all the disk nodes 2, 3 and 4, and the amount of transferred data can be cut. As a result, various processes, such as the startup of the control node 1, can be quickly executed.

In the multi-node storage system, by assigning a plurality of slices to the storage areas of the logical disk, mirroring of data can be performed with the plurality of assigned slices. An embodiment will be described in detail below, by way of example, in connection with the case of applying the functions illustrated in FIG. 1 to a multi-node storage system in which reliability is increased with the mirroring of data.

Figure 2:
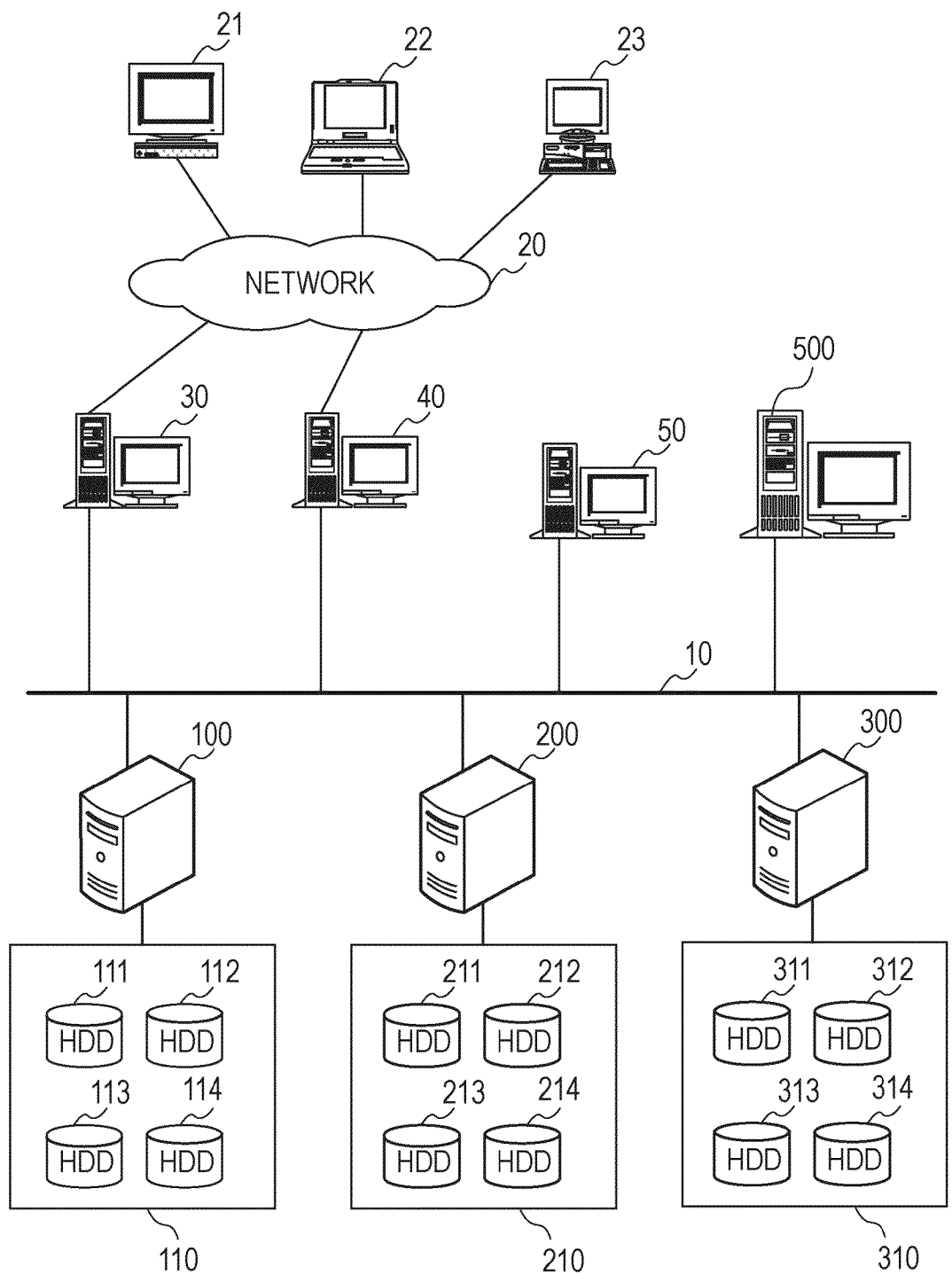
FIG. 2 illustrates an exemplary configuration of a multi-node storage system according to the embodiment.

FIG. 2 illustrates an exemplary configuration of the multi-node storage system according to the embodiment. In the illustrated embodiment, a plurality of disk nodes 100, 200 and 300, a control node 500, access nodes 30 and 40, and a management node 50 are interconnected via a network 10. Storage devices 110, 210 and 310 are connected to the disk nodes 100, 200 and 300, respectively.

The storage device 110 includes a plurality of hard disk drives (HDDs) 111, 112, 113 and 114. The storage device 210 includes a plurality of HDDs 211, 212, 213 and 214. The storage device 310 includes a plurality of HDDs 311, 312, 313 and 314. The storage devices 110, 210 and 310 are each an RAID (Redundant Arrays of Independent Disks) using the HDDs included therein. This embodiment provides disk management service of RAID5 for each of the storage devices 110, 210 and 310.

The disk nodes 100, 200 and 300 are each a computer having an architecture called IA (Intel Architecture), for example. The disk nodes 100, 200 and 300 manage data stored in the storage devices 110, 210 and 310 connected thereto, and provide the data under management to terminals 21, 22 and 23 via the network 10, respectively. Further, the disk nodes 100, 200 and 300 manage data having redundancy. In other words, the same data is managed by at least two disk nodes.

The control node 500 manages the disk nodes 100, 200 and 300. For example, when the control node 500 receives a request for adding a new storage device from the management node 50, the control node 500 defines a new logical disk and makes setting such that data stored in the added storage device can be accessed through the newly defined logical disk.

The plurality of terminals 21, 22 and 23 are connected to the access nodes 30 and 40 via the network 20. A logical disk is defined in each of the access nodes 30 and 40. In response to access requests for data on the logical disks from the terminals 21, 22 and 23, the access nodes 30 and 40 access corresponding data in the disk nodes 100, 200 and 300.

The management node 50 is a computer used by an administrator for managing the operation of the multi-node storage system. For example, the management node 50 collects information in the multi-node storage system, e.g., the amount of used storage areas in the logical disk, and displays situations of the system operation on a screen.

Figure 3:
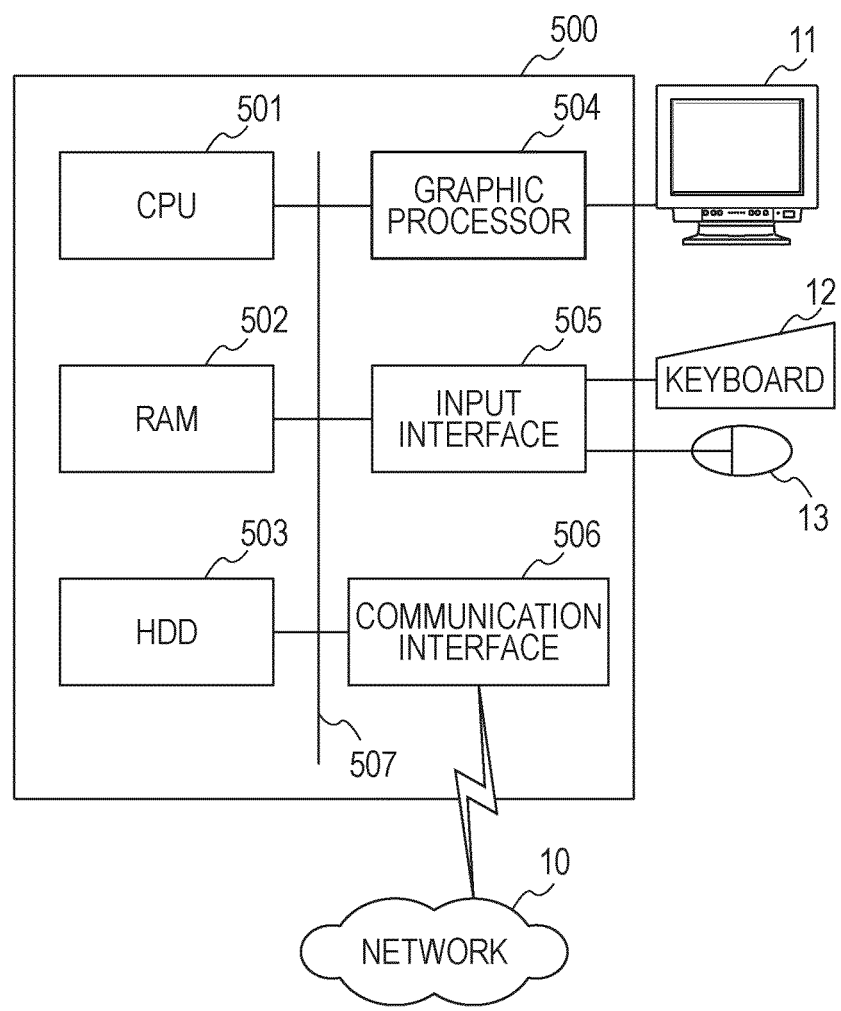
FIG. 3 illustrates an exemplary hardware configuration of a control node.

FIG. 3 illustrates an exemplary hardware configuration of the control node. The control node 500 is entirely controlled by a CPU (Central Processor) 501. A RAM (Random Access Memory) 502, a hard disk drive (HDD) 503, a graphic processor 504, an input interface 505, and a communication interface 506 are connected to the CPU 501 via a bus 507.

The RAM 502 is used as a main storage for the control node 500. The RAM 502 temporarily stores at least part of an OS program and application programs, which are run by the CPU 501. Further, the RAM 502 stores various data necessary for processing executed by the CPU 501. The HDD 503 is used as a secondary storage for the control node 500. The HDD 503 stores the OS program, application programs, and various data. A semiconductor storage, such as a flash memory, can also be used as the secondary storage.

A monitor 11 is connected to the graphic processor 504. In accordance with an instruction from the CPU 501, the graphic processor 504 displays an image on the screen of the monitor 11. A display device using a CRT (Cathode Ray Tube) or a liquid crystal display can be used as the monitor 11.

A keyboard 12 and a mouse 13 are connected to the input interface 505. The input interface 505 transmits signals, which are sent from the keyboard 12 and the mouse 13, to the CPU 501 via the bus 507. The mouse 13 is one example of pointing devices, and it may be replaced with one of other pointing devices. The other pointing devices include, for example, a touch panel, a tablet, a touch pad, and a track ball.

The communication interface 506 is connected to a network 10. The communication interface 506 transmits and receives data to and from other computers via the network 10.

The processing functions of this embodiment can be realized with the above-described hardware configuration. While FIG. 3 illustrates the hardware configuration of the control node 500, the disk nodes 100, 200 and 300, the access nodes 30 and 40, and the management node 50 can also be each realized with a similar hardware configuration to that of the control node 500.

Figure 4:
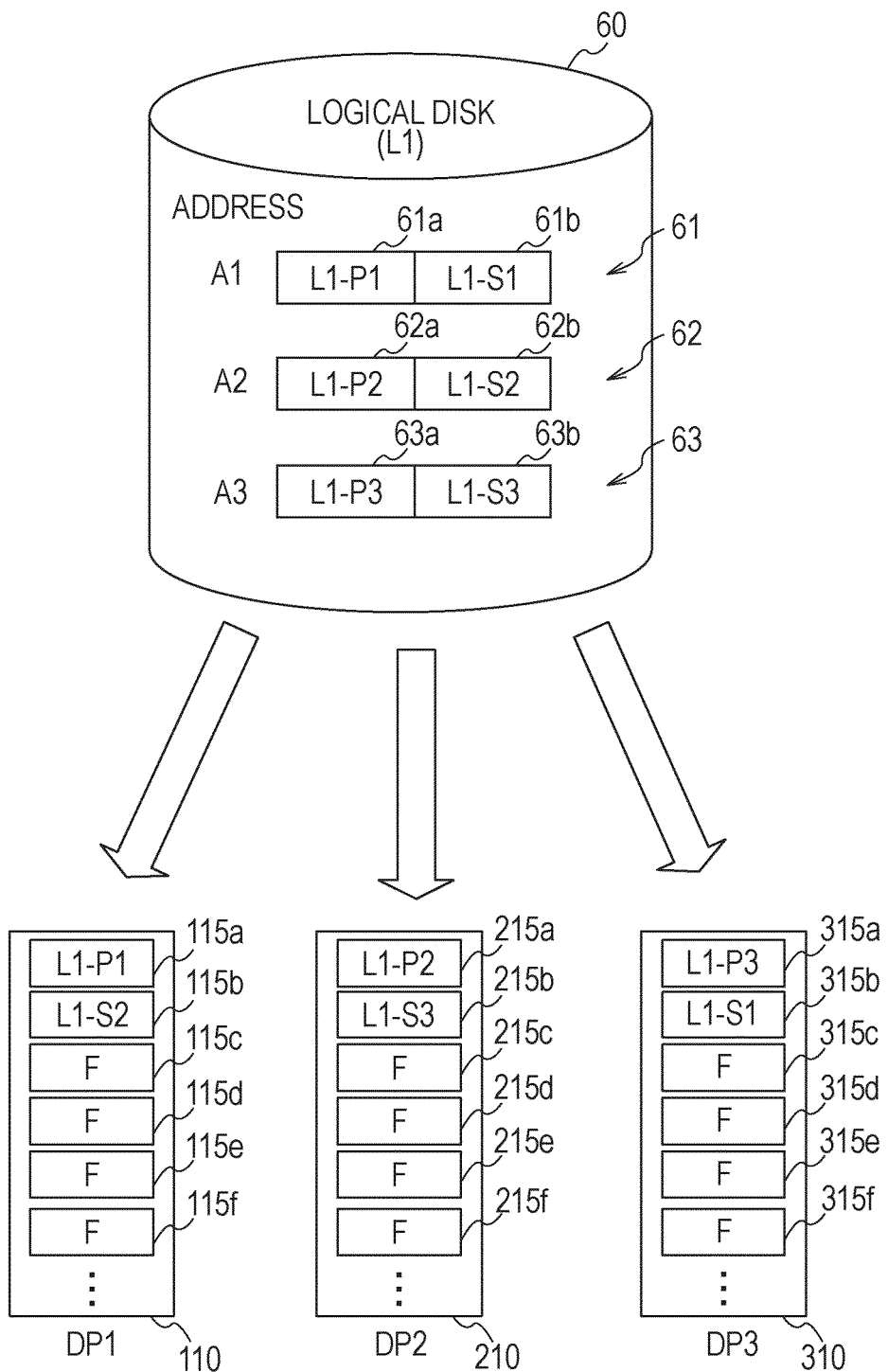
FIG. 4 illustrates a data structure of a logical disk.

FIG. 4 illustrates a data structure of a logical disk. In this embodiment, a logical disk 60 is assigned with a logical disk identifier "L1". The three disk nodes 100, 200 and 300 interconnected via the network are assigned respectively with disk node identifiers "DP1", "DP2" and "DP3" for identification of the individual disk nodes. Further, the storage devices 110, 210 and 310 connected to the disk nodes 100, 200 and 300 are uniquely identified within the network 10 based on the disk node identifiers of the disk nodes 100, 200 and 300.

The memory functions provided by the storage devices 110, 210 and 310 are managed in the form divided into a plurality of slices 115a to 115f, 215a to 215f, and 315a to 315f.

The logical disk 60 is constituted by unit storage areas of segments 61, 62 and 63. One slice in each of the segments 61, 62 and 63 has the same storage capacity as that of a slice, i.e., a management unit, in each of the storage devices 110, 210 and 310. Assuming the storage capacity of one slice in each storage device to be 1 gigabyte (GB), for example, the storage capacity of one slice in each segment is also 1 GB. The storage capacity of the logical disk 60 is an integer time the storage capacity of one segment.

For each of the segments 61, 62 and 63, an address is defined which indicates a head position of each segment in the logical disk 60. For example, the address of the segment 61 is "A1". The segments 61, 62 and 63 are each uniquely identified based on the address. When data in the segments 61, 62 and 63 is accessed, the access-target data is designated by an offset with respect to the address of the access-target segment.

The segments 61, 62 and 63 comprise respectively sets (slice pairs) of primary slices 61a, 62a and 63a and secondary slices 61b, 62b and 63b. Two slices belonging to the same segment belong to different disk nodes. An area for managing each slice includes a flag, in addition to the logical disk identifier, segment information, and information regarding the slice that constitutes the same segment. The flag stores a value representing the primary slice, the secondary slice, etc.

In an example of FIG. 4, slices constituting the segments 61, 62 and 63 of the logical disk 60 are each assigned with a symbol indicating the assignment destination of the relevant slice. The symbol is made up of the logical disk identifier of the logical disk to which the assigned segment belongs, the slice type, and the segment identification information. The slice type is indicated by any one of alphabets "P", "S" and "F". "P" represents a primary slice, "S" represents a secondary slice, and "F" represents a free slice. A numeral subsequent to the alphabet represents the number of segment in the logical disk 60 to which the assigned segment belongs. For example, the primary slice in the first segment 61 of the logical disk 60 is denoted by "L1-P1", and the secondary slice therein is denoted by "L1-S1".

The functions of the individual components will be described in detail below.

Figure 5:
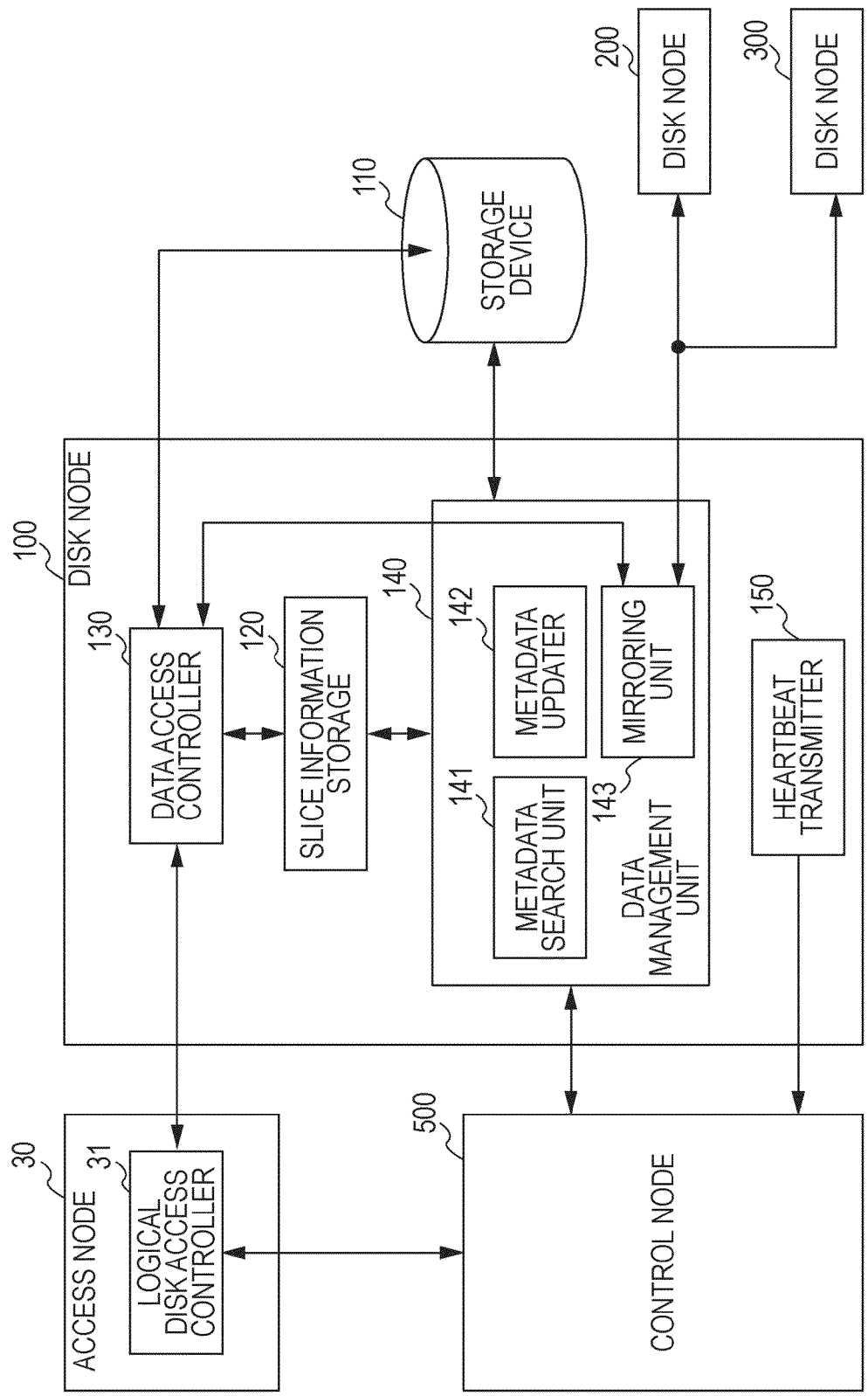
FIG. 5 is a block diagram illustrating the functions of a disk node and an access node.

FIG. 5 is a block diagram illustrating the functions of the disk node and the access node. The access node 30 includes a logical disk access controller 31. In response to access requests sent from the terminals 21, 22 and 23 (shown in FIG. 2) along with designation of data in the logical disk 60 (shown in FIG. 4), the logical disk access controller 31 performs data access to the disk nodes that manage the designated data. More specifically, the logical disk access controller 31 obtains, via the control node 500, information (metadata) regarding, e.g., the location of each of slices which are assigned to the segments of the logical disk 60, at startup of the access node 30. Upon receiving the access request from any of the terminals 21, 22 and 23, the logical disk access controller 31 specifies the segment in the logical disk 60 in which the access-target data is stored. Then, the logical disk access controller 31 specifies the slice that is assigned as the primary slice to the specified segment, and further specifies the disk node that manages the assigned slice. In addition, the logical disk access controller 31 outputs, to the specified disk node, the access request for the specified slice.

If an error response occurs when access is made to the disk node, the logical disk access controller 31 inquires the control node 500 of the metadata while designating the access-target segment. Responsively, the control node 500 obtains the metadata regarding the relevant segment from the disk node and replies the obtained metadata to the logical disk access controller 31. As a result, the logical disk access controller 31 can obtain the latest metadata.

Be it noted that the access node 40 also has similar functions to those of the access node 30.

The disk node 100 includes a slice information storage 120, a data access controller 130, a data management unit 140, and a heartbeat transmitter 150.

The slice information storage 120 stores slice information for managing the slices of the storage device 110. For example, part of a storage area in the RAM of the disk node 100 is used as the slice information storage 120. The term "slice information" implies grouped items of the metadata set per slice. The term "metadata" implies information indicating, e.g., the segment to which the corresponding slice is assigned, and the other slice that is a counterpart of the paired slices.

Upon receiving the access request (read request or write request) from the access node 30, the data access controller 130 determines the slice, which is the access target, by referring to the slice information storage 120. The data access controller 130 then accesses the data in the storage device 110 corresponding to the access request. For example, if the access request is a read request, the data access controller 130 obtains data from the storage device 110 and transmits the data to the access node 30.

If the access request is a write request, the data access controller 130 writes data into the storage device 110. At that time, the data access controller 130 transfers the write-target data to a mirroring unit 143. Further, upon receiving a notice indicating completion of the data write into the slice as the counterpart of the paired slices, the data access controller 130 transmits, to the access node 30, a response indicating the completion of the data write.

The data management unit 140 manages the data in the storage device 110. More specifically, the data management unit 140 executes not only management of the metadata stored in both the storage device 110 and the slice information storage 120, but also a mirroring process at the time of data write. To that end, the data management unit 140 includes a metadata search unit 141, a metadata updater 142, and a mirroring unit 143.

The metadata search unit 141 executes a search for the metadata in the slice information storage 120 in response to a request from the control node 500. The metadata search includes a process of searching for the metadata indicating a predetermined type of slice and obtaining the number of search hits.

The metadata updater 142 updates the contents of the metadata stored in both the storage device 110 and the slice information storage 120. For example, at startup of the disk node 100, the metadata updater 142 reads the metadata stored in the storage device 110 and then stores the read metadata in the slice information storage 120. Further, in response to an update instruction from the control node 500, the metadata updater 142 updates the metadata stored in both the slice information storage 120 and the storage device 110.

The mirroring unit 143 executes mirroring of each data stored in the storage device 110. More specifically, when data is written into any slice in the storage device 110 by the data access controller 130, the mirroring unit 143 refers to the slice information storage 120 and determines the slice (secondary slice) as a counterpart paired with the slice (primary slice) into which the data has been written. Further, the mirroring unit 143 transmits the written data to the disk node that manages the counterpart one of the paired slices, and requests the relevant disk node to write the data into the counterpart one of the paired slices. When the data write into the slice as the counterpart of the paired slices is completed, the mirroring unit 143 notifies the completion of that data write to the data access controller 130.

Further, when a copy of data having been written into any primary slice is received from the other disk nodes 200 and 300, the mirroring unit 143 writes the received data into the secondary slice in the storage device 110, which is a counterpart paired with the updated primary slice. Then, the mirroring unit 143 transmits a response indicating the completion of the data write.

When the disk node 100 and the storage device 110 are normally operating, the heartbeat transmitter 150 periodically transmits, to the control node 500, a normal-state notice (called a "heartbeat") indicating the normal operation of both the disk node 100 and the storage device 110. If the heartbeat from the disk node 100 is interrupted for a certain time, the control node 500 recognizes that a failure has occurred in the disk node 100.

Each of the disk nodes 200 and 300 also has similar functions to those of the disk node 100.

Figure 6:
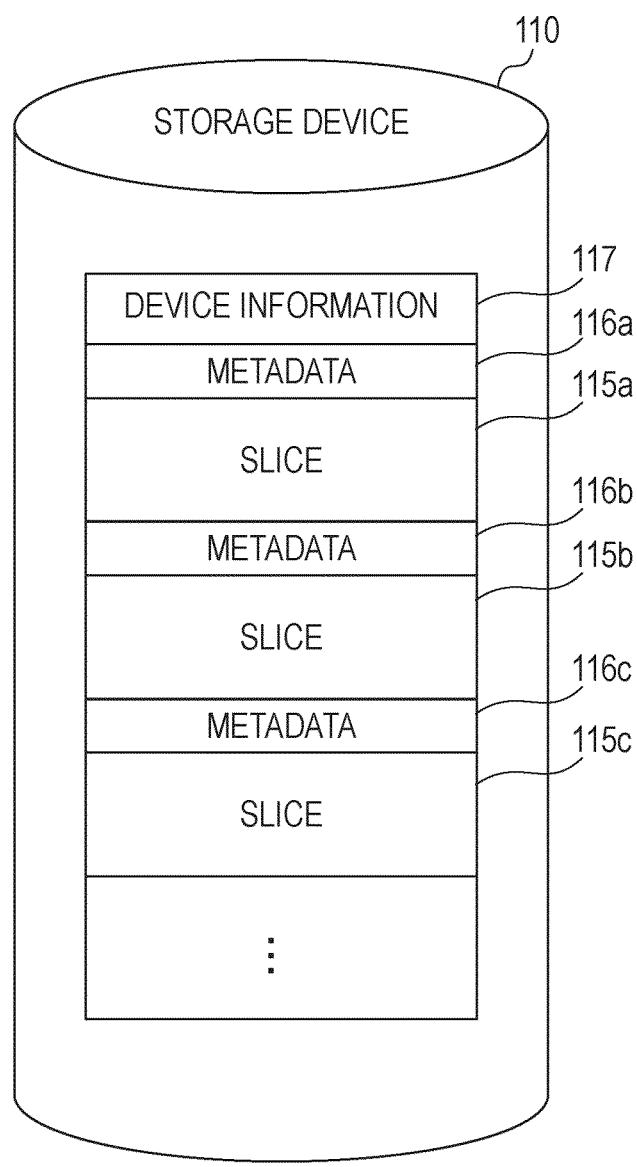
FIG. 6 illustrates an exemplary data structure of a storage device.

FIG. 6 illustrates an exemplary data structure of the storage device. The storage device 110 stores, in addition to slices 115a, 115b, 115c, etc., plural sets of metadata 116a, 116b, 116c, etc. At the startup of the disk node 100, the metadata 116a, 116b, 116c, etc. stored in the storage device 110 are read by the metadata updater 142 of the disk node 100 and are stored in the slice information storage 120.

Further, device information 117 is stored at the head of a storage area in the storage device 110. The device information 117 defines a layout pattern of the metadata 116a, 116b, 116c, etc. and the slices 115a, 115b, 115c, etc. In an example of FIG. 6, just prior to each of respective storage areas of the slices 115a, 115b, 115c, etc., the metadata regarding the relevant slice is stored. As another layout pattern, all the metadata 116a, 116b, 116c, etc. may be contained in the device information 117.

The data structure of the slice information storage 120, which stores the metadata 116a, 116b, 116c, etc. in the storage device 110, will be described below.

FIG. 7 illustrates an exemplary data structure of the slice information storage. The slice information storage 120 stores a metadata table 121. The metadata table 121 has columns of "logical disk ID", "address", "type", "disk node ID", "slice ID", "mirror disk node ID", and "mirror slice ID". Information items horizontally arranged in the metadata table 121 are correlated to each other and constitute one set of records representing one set of metadata.

The column of "logical disk ID" is used to set identification information (logical disk ID) for identifying the logical disk to which the segment corresponding to the relevant slice belongs.

The column of "address" is used to set the head address of the segment to which the relevant slice is assigned.

The column of "type" is used to set a type flag indicating the type that is assigned to the relevant slice. When the relevant slice is not assigned to any segment of the logical disk, a type flag "F" indicating the relevant slice being a free slice is set in this column.

When the relevant slice is assigned as the primary slice to the segment of the logical disk, the type flag "P" or "SP" is set. The type flag "P" represents the primary slice for which the secondary slice (mirror slice) is present in pair. The type flag "SP" represents the primary slice (single primary slice) for which the mirror slice is not present because of, e.g., a failure.

Additionally, the type flag "SP" can also be called a degenerate flag indicating that the dual state of the segment to which the primary slice is assigned is impaired.

When the relevant slice is assigned as the secondary slice to the segment of the logical disk, the type flag "S" is set.

Redundancy is not ensured for the segment to which the single primary slice is assigned. Such a segment is called a "degenerate segment". A slice to be assigned as the secondary slice is reserved for the degenerate segment. The reserved slice is called a "reserve slice". Data is copied from the primary slice to the reserve slice of the degenerate segment. As a result, the dual state of the data in the degenerate segment is recovered. For the metadata of the reserve slice during such a dual-state recovery process, a type flag "R" is set until copying of the data is completed. Upon the completion of copying of the data from the primary slice to the reserve slice, the reserve slice is changed to the secondary slice.

The column of "disk node ID" is used to set the identification information (disk node ID) of the disk node 100 that manages the relevant slice.

The column of "slice ID" is used to set an identifier (slice ID) for identifying, within the storage device 110, the relevant slice corresponding to the metadata.

The column of "mirror disk node ID" is used to set an identifier (storage ID) of the storage device including the mirror slice (i.e., the other slice in pair which belongs to the same segment).

The column of "mirror slice ID" is used to set an identifier (slice ID) for identifying the mirror slice within the storage device to which the mirror slice belongs.

The functions of the control node 500 will be described below.

Figure 8:
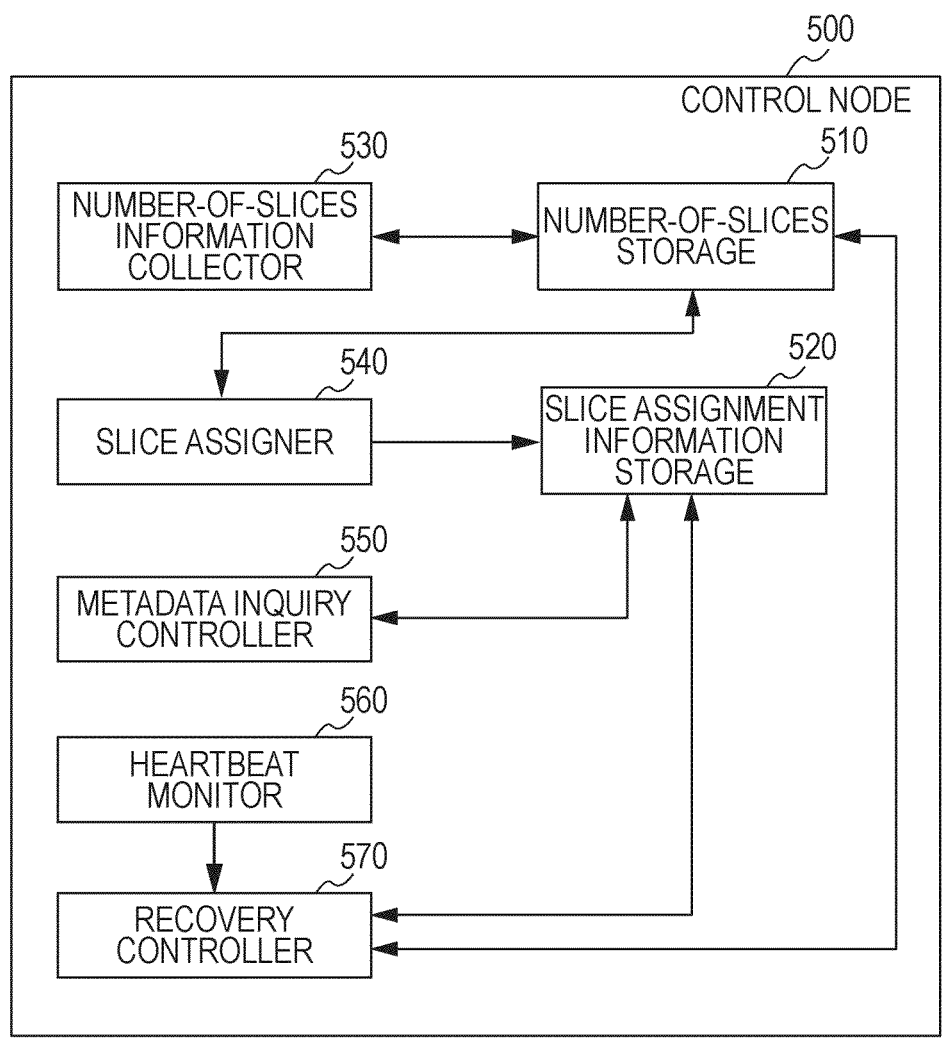
FIG. 8 is a block diagram illustrating the functions of the control node.

FIG. 8 is a block diagram illustrating the functions of the control node. The control node 500 includes a number-of-slices storage 510, a slice assignment information storage 520, a number-of-slices information collector 530, a slice assigner 540, a metadata inquiry controller 550, a heartbeat monitor 560, and a recovery controller 570.

The number-of-slices storage 510 stores information (i.e., number-of-slices information) indicating the number of slices per type which are managed by each of the disk nodes 100, 200 and 300. For example, one part of a storage area in the RAM 502 of the control node 500 is used as the number-of-slices storage 510.

The slice assignment information storage 520 stores information regarding assignment of the slices to the segments of the logical disk. For example, another part of the storage area in the RAM 502 of the control node 500 is used as the slice assignment information storage 520.

The number-of-slices information collector 530 collects, from each of the disk nodes 100, 200 and 300, the number-of-slices information regarding the slices, which are managed by the relevant disk node, at the startup of the control node 500. Further, the number-of-slices information collector 530 stores the collected number-of-slices information into the number-of-slices storage 510.

The slice assigner 540 executes the assignment of the slices to the segments of the logical disk. For example, upon receiving an instruction of adding the logical disk from the management node 50, the slice assigner 540 determines the number of slices which are to be assigned to segments constituting the added logical disk. When the slices are mirrored into the dual state, the slices are required in number twice the number of segments. The slice assigner 540 then refers to the number-of-slices storage 510 and obtains the number of free slices among the slices which are managed by each of the disk nodes 100, 200 and 300. Further, the slice assigner 540 determines, for each of the disk nodes 100, 200 and 300, the number of slices used for the assignment to the segments (i.e., the number of provided slices) depending on the number of free slices in each of the disk nodes 100, 200 and 300. The slice assigner 540 then obtains slice IDs of the free slices in number corresponding to the number of provided slices from each of the disk nodes 100, 200 and 300. The slice assigner 540 assigns the slices, which are denoted by the obtained slice IDs, to the segments of the newly prepared logical disk. After assigning the slices to the segments, the slice assigner 540 registers the result of the assignment in the slice assignment information storage 520.

Upon receiving a metadata inquiry request from any of the access nodes 30 and 40, the metadata inquiry controller 550 obtains the metadata from the disk nodes 100, 200 and 300. Further, the metadata inquiry controller 550 transmits the obtained metadata to the access node which has output the metadata inquiry request.

The heartbeat monitor 560 monitors whether the heartbeat from each of the disk nodes 100, 200 and 300 arrives periodically. If the heartbeat monitor 560 detects that the heartbeat from any of the disk nodes is interrupted for a certain time or longer, it determines that the relevant disk node has failed. Upon detecting the failed disk node, the heartbeat monitor 560 notifies the disk node ID of the failed disk node to the recovery controller 570.

Upon receiving the disk node ID of the failed disk node from the heartbeat monitor 560, the recovery controller 570 executes a process of disconnecting the failed disk node. Herein, the term "disk node disconnecting process" implies a process of excluding the disk node from the data storage target in the multi-node storage system. The recovery controller 570 executes a dual-state recovery process for the degenerate segment that has been generated by disconnecting the disk node.

Decentralized management of the metadata is performed through the cooperation of the various nodes having the above-described functions. The decentralized management of the metadata can reduce the amount of metadata to be transmitted and received for the system operation. Processes requiring transmission and reception of the metadata include a startup/failover process, a logical disk preparation process, a logical disk deletion process, a metadata inquiry process, and a dual-state recovery process. Those processes requiring transmission and reception of the metadata will be described one by one below.

Figure 9:
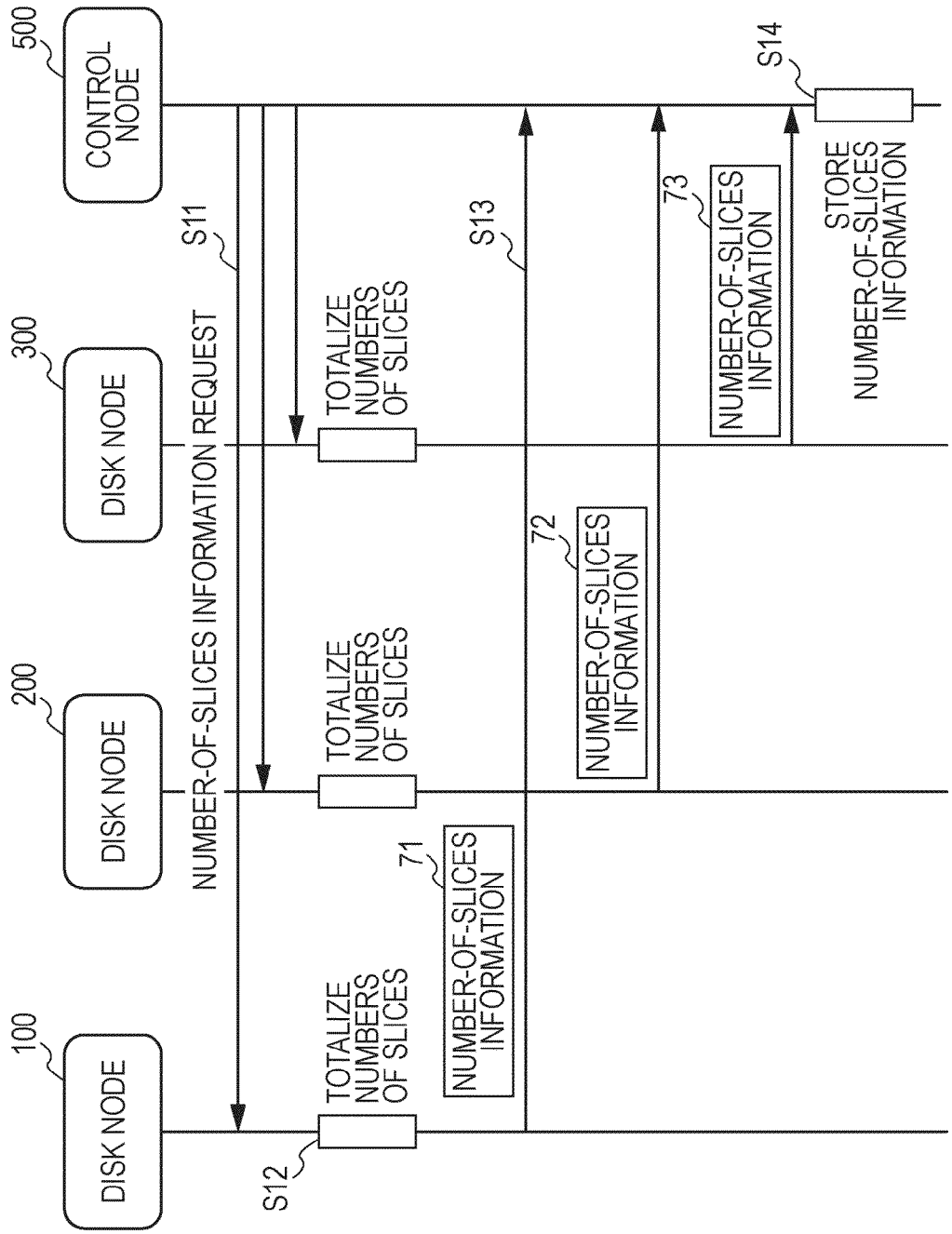
FIG. 9 is a sequence chart illustrating the procedures of a control node startup process.

FIG. 9 is a sequence chart illustrating the procedures of a control node startup process. The control node startup process illustrated in FIG. 9 will be described below following the operation numbers.

[Operation S11] When the control node 500 is started up, the number-of-slices information collector 530 of the control node 500 transmits the number-of-slices information request to each of the disk nodes 100, 200 and 300.

[Operation S12] In the disk node 100 having received the number-of-slices information request, the metadata search unit 141 totalizes the number of slices per type. More specifically, the metadata search unit 141 executes a search per type flag in the slice information storage 120 with the type flag used as a keyword. The number of metadata for which the search has hit is the number of slices of the type indicated by the type flag which has been used as the search keyword. The metadata search unit 141 obtains the number of slices per type and then brings the obtained respective numbers of slices together to prepare number-of-slices information 71.

Similarly, sets of number-of-slices information 72 and 73 resulting from totalizing the numbers of slices are prepared in the disk nodes 200 and 300, respectively.

[Operation S13] The metadata search unit 141 of the disk node 100 transmits the prepared number-of-slices information 71 to the control node 500. Similarly, the sets of number-of-slices information 72 and 73 are transmitted to the control node 500 from the disk nodes 200 and 300, respectively.

[Operation S14] In the control node 500 having received the sets of number-of-slices information 71, 72 and 73 from the disk nodes 100, 200 and 300, respectively, the number-of-slices information collector 530 stores the sets of number-of-slices information 71, 72 and 73 in the number-of-slices storage 510.

In such a manner, the number-of-slices information is collected at the startup of the control node 500. If the failover occurs, a slice information collection process similar to that illustrated in FIG. 9 is also executed by a node taking over the subsequent process.

FIG. 10 illustrates an exemplary data structure of the number-of-slices storage. The number-of-slices storage 510 stores a number-of-slices information table 511. The number-of-slices information table 511 has columns of "disk node ID", "number of primary slices", "number of secondary slices", "number of free slices", "number of single primary slices", and "number of reserve slices". In the number-of-slices information table 511, information items horizontally arranged in the table are correlated to each other and constitute a set of records representing the sets of number-of-slices information 71, 72 and 73 transmitted respectively from the disk nodes 100, 200 and 300.

The column of "disk node ID" is used to set the disk node ID of the disk node that has transmitted the number-of-slices information. The column of "number of primary slices" is used to set the number of primary slices which are managed by the corresponding disk node. The column of "number of secondary slices" is used to set the number of secondary slices which are managed by the corresponding disk node. The column of "number of free slices" is used to set the number of free slices which are managed by the corresponding disk node. The column of "number of single primary slices" is used to set the number of single primary slices which are managed by the corresponding disk node. The column of "number of reserve slices" is used to set the number of reserve slices which are managed by the corresponding disk node.

The number of free slices in each of the disk nodes 100, 200 and 300 can be confirmed by referring to the number-of-slices information table 511 described above. Further, when a logical disk is prepared, the number of provided slices to be assigned to each of the disk nodes 100, 200 and 300 can be determined based on the information regarding the number of free slices per disk node.

Figure 11:
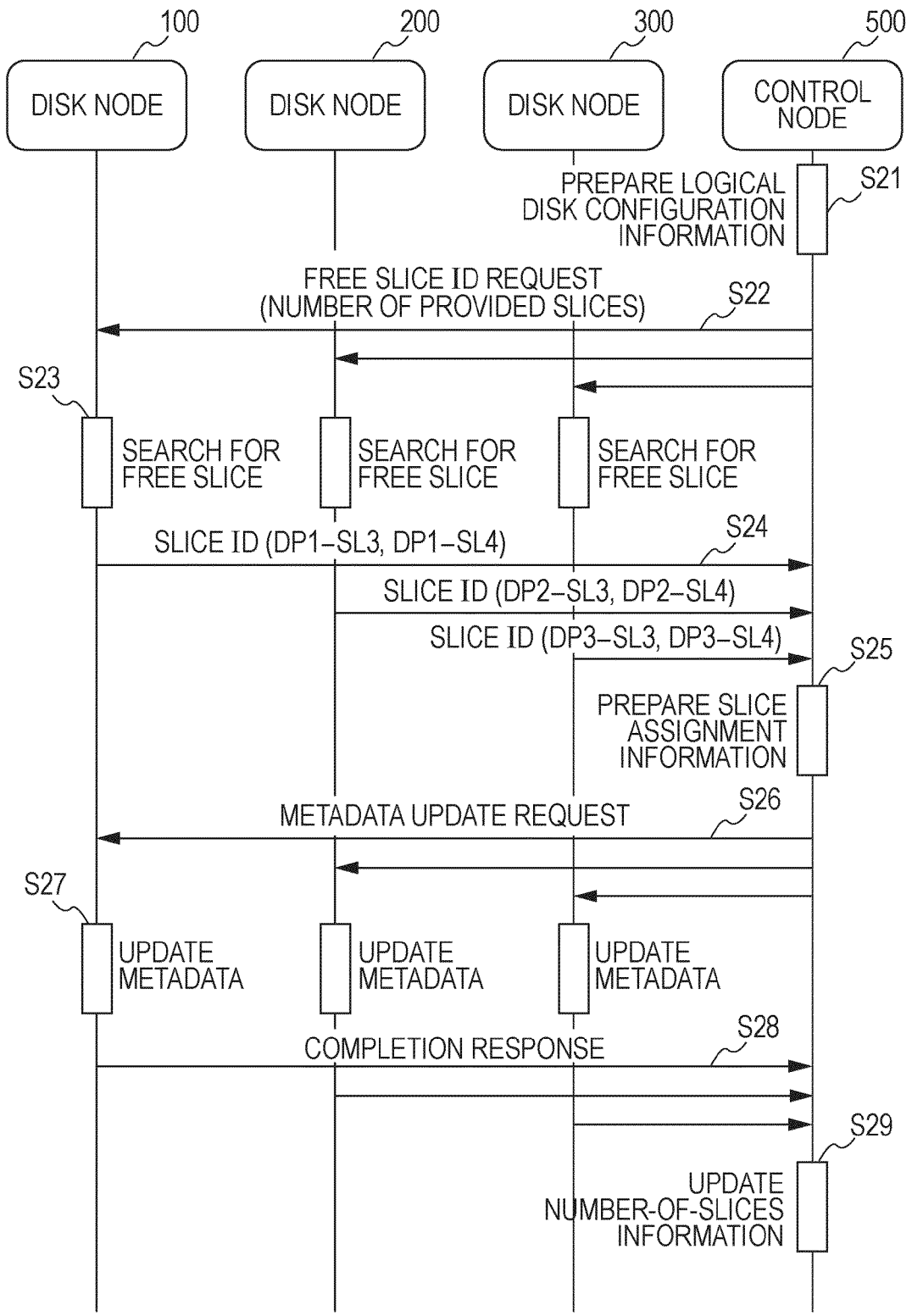
FIG. 11 is a sequence chart illustrating the procedures of a logical disk preparation process.

FIG. 11 is a sequence chart illustrating the procedures of a logical disk preparation process. The logical disk preparation process illustrated in FIG. 11 will be described below following the operation numbers. The logical disk preparation process is executed, for example, when the administrator of the system inputs an instruction of preparing a logical disk to the management node 50 and an instruction of adding the logical disk is output from the management node 50 to the control node 500. The number of segments constituting the added logical disk and the storage capacity per segment are denoted in the instruction of adding the logical disk.

[Operation S21] Upon receiving the instruction of adding the logical disk, the slice assigner 540 of the control node 500 prepares logical disk configuration information. The term "logical disk configuration information" implies information that defines segments constituting the newly prepared logical disk. After preparing the logical disk configuration information, the slice assigner 540 determines the number of slices provided by each of the disk nodes 100, 200 and 300.

At that time, the slice assigner 540 assigns the number of provided slices such that the total number of provided slices is equal to the number of slices to be assigned to the logical disk (i.e., twice the number of segments of the logical disk). Also, the slice assigner 540 refers to the number-of-slices information table 511 in the number-of-slices storage 510 and sets the number of slices provided by each of the disk nodes 100, 200 and 300 to be equal to or smaller than the number of free slices in the relevant disk node.

In processing of operation S25 described later, the slice corresponding to the slice ID, which is notified depending on the number of provided slices, is assigned as the primary slice or the secondary slice to the segment. In the case of mirroring data, the primary slice and the secondary slice are managed by separate disk nodes. Accordingly, if there is a disk node in which the number of provided slices exceeds a half the total number of provided slices, a segment is generated in which mirroring into the dual state of data cannot be performed. To prevent the generation of the segment in which mirroring into the dual state of data cannot be performed, the slice assigner 540 makes more even the numbers of slices provided by the disk nodes such that the number of slices provided by one disk node does not exceed a half the total number of provided slices. Further, the slice assigner 540 makes more even the numbers of slices provided by the disk nodes to prevent a load from being concentrated on one disk node.

In addition, the slice assigner 540 determines which slice of which disk node is assigned to which one of the segments of the logical disk. At that time, the slice assigner 540 further determines the type of the slice to be assigned. The resulting slice assignment relations are stored, as the logical disk configuration information, in the slice assignment information storage 520.

[Operation S22] The slice assigner 540 transmits, to each of the disk nodes 100, 200 and 300, a free slice ID request along with designation of the number of slices provided by the relevant disk node.

[Operation S23] Upon receiving the free slice ID request, the metadata search unit 141 of the disk node 100 searches for the metadata of the free slices in the slice information storage 120. In other words, the metadata search unit 141 searches the slice information storage 120 with the type flag "F" used as a keyword. Then, the metadata search unit 141 selects the metadata corresponding to the number of provided slices from among the metadata for which the search has hit. Similarly, the free slice search process is executed in each of the disk nodes 200 and 300 as well.

[Operation S24] The metadata search unit 141 transmits the slice ID of each selected metadata to the control node 500. In an example of FIG. 11, the metadata search unit 141 transmits the slice IDs "SL3, SL4". Similarly, the slice IDs corresponding to the number of provided slices are also transmitted to the control node 500 from each of the disk nodes 200 and 300.

[Operation S25] The slice assigner 540 of the control node 500 prepares the slice assignment information based on the slice IDs transmitted from the disk nodes 100, 200 and 300. The slice assignment information is prepared by assigning the slices, which are denoted by the obtained slice IDs, to the segments denoted by the logical disk configuration information that has been prepared in operation S21. At that time, the slice assigner 540 assigns two slices to one segment. One of the two slices is the primary slice, and the other is the secondary slice. The primary slice and the secondary slice both assigned to one segment are always selected from the different disk nodes.

[Operation S26] The slice assigner 540 transmits a metadata update request to each of the disk nodes 100, 200 and 300 based on the slice assignment information. The metadata update request includes metadata that represents not only information regarding the segments which are assignment destinations of the slices corresponding to the slice IDs notified from each of the disk nodes 100, 200 and 300, but also information indicating the mirror slices.

[Operation S27] The metadata updater 142 of the disk node 100 updates the metadata in both the slice information storage 120 and the storage device 110 in accordance with the metadata update request transmitted from the control node 500. More specifically, the metadata updater 142 updates the metadata of the slices, which have been newly assigned to the segments, based on the details of the slice assignment. Similarly, the metadata update process is executed in the disk nodes 200 and 300 as well.

[Operation S28] After completion of the update of the metadata, the metadata updater 142 transmits a completion response to the control node 500. Similarly, a completion response is also transmitted from each of the disk nodes 200 and 300 to the control node 500.

[Operation S29] Upon receiving the completion responses from the disk nodes 100, 200 and 300, the slice assigner 540 of the control node 500 updates the number-of-slices information in the number-of-slices storage 510. More specifically, the slice assigner 540 subtracts, from the number of free slices in each of the disk nodes 100, 200 and 300, the number of slices provided by the relevant disk node. Also, the slice assigner 540 subtracts, from the number of primary slices in each of the disk nodes 100, 200 and 300, the number of slices which have been newly assigned as the primary slices from among the slices in the relevant disk node. Further, the slice assigner 540 subtracts, from the number of secondary slices in each of the disk nodes 100, 200 and 300, the number of slices which have been newly assigned as the secondary slices from among the slices in the relevant disk node. As a result, the latest assignment state is reflected on the number-of-slices information in the number-of-slices storage 510.

A process of preparing the slice assignment information will be described in detail below. The slice assignment information is prepared based on the logical disk configuration information.

FIG. 12 illustrates an exemplary data structure of the logical disk configuration information. The logical disk configuration information is registered in a logical disk configuration information table 521 within the slice assignment information storage 520. The logical disk configuration information table 521 has columns of "logical disk ID", "address", "type", "disk node ID", "temporary slice ID", "mirror disk node ID", and "temporary mirror slice ID". Items of information registered in the columns are the same as those registered in the columns having the same names as those in the metadata table 121, illustrated in FIG. 7, except for the columns of "temporary slice ID" and "temporary mirror slice ID".

The column of "temporary slice ID" is used to set temporary identification information (temporary slice ID) of the slice assigned to the corresponding segment as the type (i.e., the primary slice or the secondary slice), which is indicated by the type flag.

The column of "temporary mirror slice ID" is used to set temporary identification information (temporary mirror slice ID) of the slice to be paired with the slice, which is indicated by the temporary slice ID, in the corresponding segment.

In a state having the logical disk configuration information table 521 described above, the slice assigner 540 transmits the free slice ID request to each of the disk nodes 100, 200 and 300. Responsively, the slice assigner 540 obtains the slice IDs from the disk nodes 100, 200 and 300.

FIG. 13 illustrates a group of slice IDs obtained by the control node. The slice assigner 540 of the control node 500 stores the slice IDs of the free slices, which have been obtained from the disk nodes 100, 200 and 300, in a memory in correspondence to the disk node IDs of the disk nodes which are sources having transmitted the free slice IDs. Further, the slice assigner 540 replaces the temporary slice IDs, which are set in the logical disk configuration information table 521, with the slice IDs obtained from the disk nodes, thus preparing the slice assignment information. Be it noted that the logical disk configuration information table 521 is intermediate data for preparing the slice assignment information and is erased from the slice assignment information storage 520 after the slice assignment information has been prepared.

FIG. 14 illustrates an exemplary data structure of the slice assignment information. A slice assignment information table 522 has columns of "logical disk ID", "address", "type", "disk node ID", "slice ID", "mirror disk node ID", and "mirror slice ID". Items of information registered in the columns are the same as those registered in the columns having the same names as those in the metadata table 121, illustrated in FIG. 7. The information items horizontally arranged in the slice assignment information table 522 are correlated to each other and constitute one set of records representing one set of metadata.

In the slice assignment information table 522, the slice IDs obtained from the corresponding disk nodes are set instead of the temporary slice ID and the temporary mirror slice ID, which have been set in the logical disk configuration information table 521. As a result, the slices assigned to the segments are definitely determined.

A process of deleting the logical disk will be described below.

Figure 15:
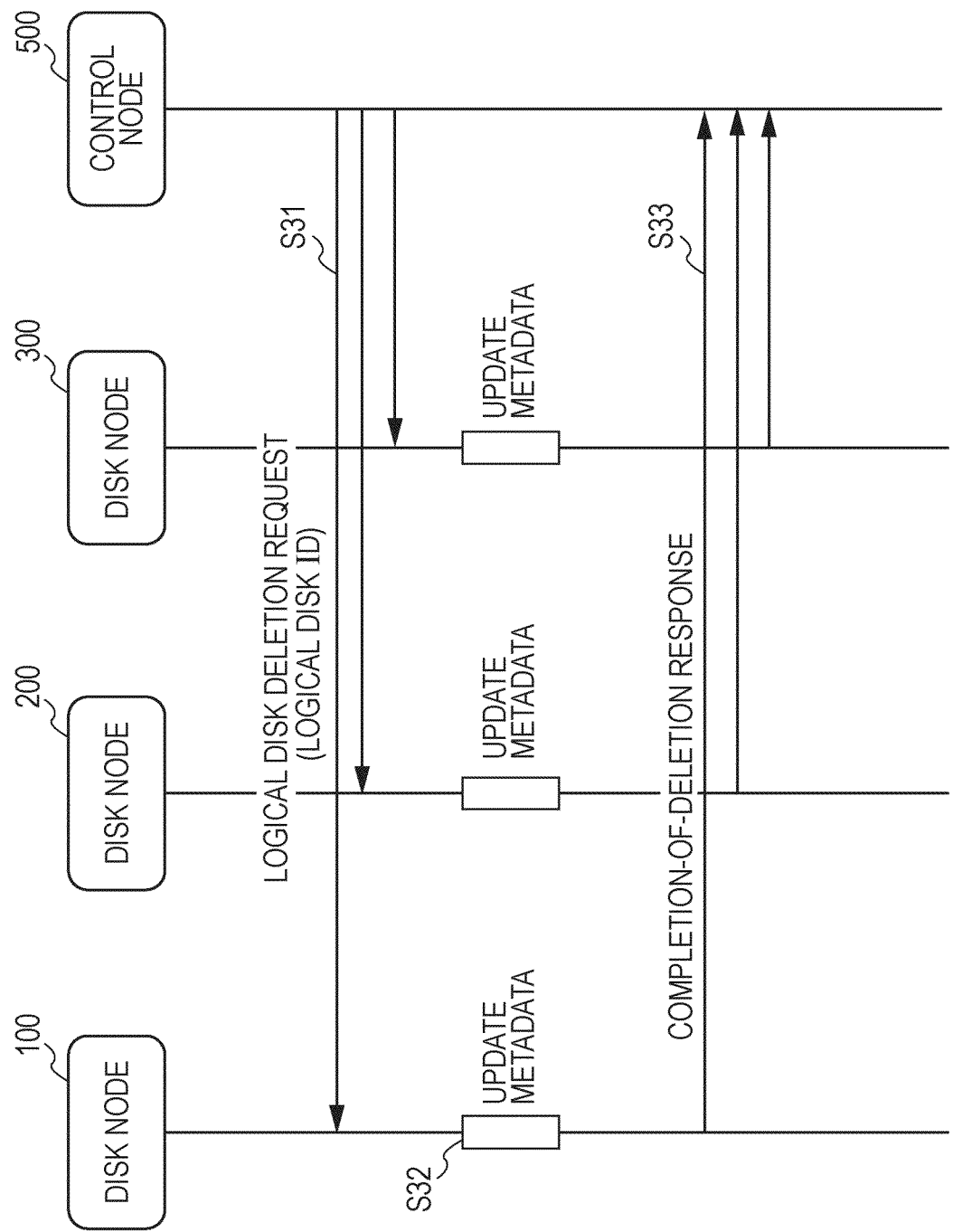
FIG. 15 is a sequence chart illustrating the procedures of a logical disk deletion process.

FIG. 15 is a sequence chart illustrating the procedures of the logical disk deletion process. The procedures illustrated in FIG. 15 will be described below following the operation numbers. The logical disk deletion process is executed, for example, when the administrator of the system inputs an instruction of deleting a logical disk to the management node 50 and an instruction of deleting the logical disk is output from the management node 50 to the control node 500.

[Operation S31] The slice assigner 540 of the control node 500 transmits, to each of the disk nodes 100, 200 and 300, a logical disk deletion request including the logical disk ID of the logical disk that is to be deleted.

[Operation S32] The metadata updater 142 of the disk node 100 updates the metadata in both the slice information storage 120 and the storage device 110 in accordance with the logical disk deletion request transmitted from the control node 500. More specifically, the metadata updater 142 changes the type of each of the slices assigned to the segments, which constitute the logical disk to be deleted, to "free slice". Further, the metadata updater 142 deletes the information indicating the assignment relation of each slice of which type has been changed to "free slice". Similarly, the metadata update process is executed in the disk nodes 200 and 300 as well.

[Operation S33] After completion of the update of the metadata, the metadata updater 142 transmits a completion response to the control node 500. Similarly, a completion response is also transmitted from each of the disk nodes 200 and 300 to the control node 500.

The logical disk can be deleted in such a manner. As a result of deleting the logical disk, the number of free slices is increased and the respective numbers of primary slices and secondary slices are reduced in each of the disk nodes 100, 200 and 300. Therefore, the control node 500 is required to update the information in the number-of-slices storage 510 to the latest information.

After removing the logical disk, for example, the slice assigner 540 of the control node 500 transmits the number-of-slices information request to each of the disk nodes 100, 200 and 300 similarly to the startup process illustrated in FIG. 9. Responsively, the slice assigner 540 obtains the number-of-slices information from each of the disk nodes 100, 200 and 300 and updates the information in the number-of-slices storage 510.

In the processing of operation S33 illustrated in FIG. 15, each of the disk nodes 100, 200 and 300 may transmit the completion-of-deletion response, including the number-of-slices information, to the control node 500. This enables the control node 500 to maintain the contents of the number-of-slices storage 510 in the latest state immediately after the deletion of the logical disk.

The metadata inquiry process will be described below. The metadata inquiry process is started in accordance with a metadata inquiry request from any of the access nodes 30 and 40. The metadata inquiry request from any of the access nodes 30 and 40 is output when any of the access nodes 30 and 40 is started up and when an error has occurred in access to data in the logical disk from any of the access nodes 30 and 40. The following description is made for the metadata inquiry process in connection with each of those cases.

Figure 16:
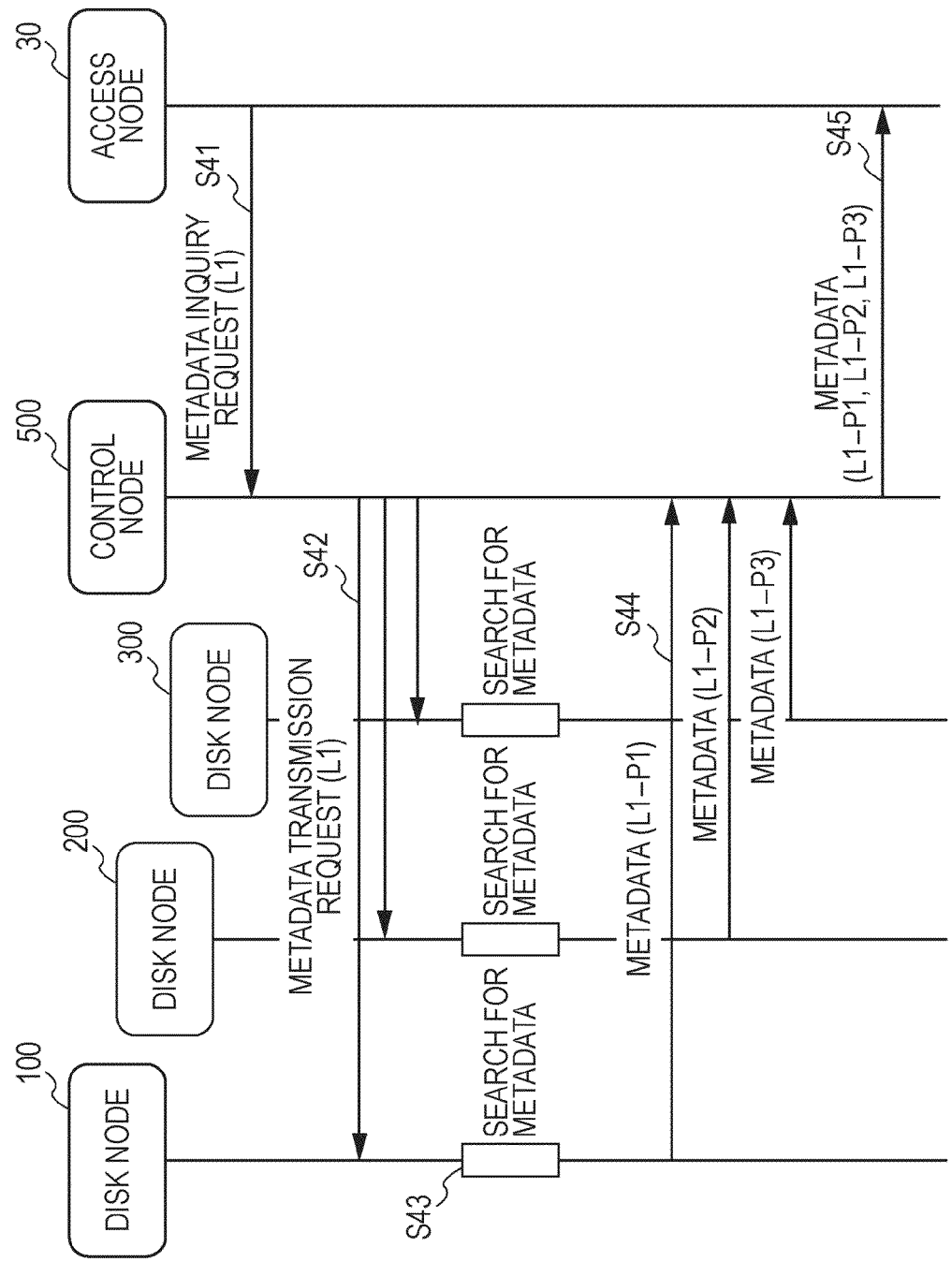
FIG. 16 is a sequence chart illustrating the procedures of a metadata inquiry process at startup of the access node.

FIG. 16 is a sequence chart illustrating the procedures of the metadata inquiry process at the startup of the access node. The process illustrated in FIG. 16 will be described below following the operation numbers.

[Operation S41] At the startup of the access node 30, the logical disk access controller 31 of the access node 30 transmits the metadata inquiry request to the control node 500 along with designation of the logical disk ID that is registered in advance. In an example of FIG. 16, the logical disk ID "L1" is designated. It is here assumed that the slice assignment relation with respect to the segments 61, 62 and 63 constituting the logical disk 60 having the logical disk ID "L1" is as per illustrated in FIG. 4.

[Operation S42] Upon receiving the metadata inquiry request from the access node 30, the metadata inquiry controller 550 of the control node 500 transmits a metadata transmission request to each of the disk nodes 100, 200 and 300. The metadata transmission request includes the logical disk ID that has been denoted in the metadata inquiry request.

[Operation S43] The metadata search unit 141 of the disk node 100 executes a search for the metadata in response to the metadata transmission request. More specifically, the metadata search unit 141 searches for the metadata in the slice information storage 120 based on the logical product (AND) condition by using, as keywords, the logical disk ID denoted in the metadata transmission request and the type "P" (primary slice). As a result, the metadata of the slices, which are each assigned as the primary slice to the segments of the logical disk denoted by the logical disk ID. Similarly, the metadata search process is executed in the disk nodes 200 and 300 as well.

[Operation S44] The metadata search unit 141 obtains, from the slice information storage 120, the metadata for which the search has hit, and transmits the hit metadata to the control node 500. Similarly, the metadata for which the search has hit is transmitted from each of the disk nodes 200 and 300 to the control node 500. In the example of FIG. 16, the metadata of the primary slice assigned to the first segment (having the address "A1") is transmitted from the disk node 100. The metadata of the primary slice assigned to the second segment (having the address "A2") is transmitted from the disk node 200. The metadata of the primary slice assigned to the third segment (having the address "A3") is transmitted from the disk node 300.

[Operation S45] The metadata inquiry controller 550 of the control node 500 transfers the metadata, obtained from the disk nodes 100, 200 and 300, to the access node 30.

In such a manner, the access node 30 can obtain the latest metadata at the startup. Further, when an access generates along with designation of data in the logical disk 60, the access node 30 can transmit, based on the obtained metadata, an access request to the disk node that stores the access-target data.

The following description is made for the metadata inquiry process in connection with the case where an access error has occurred.

Figure 17:
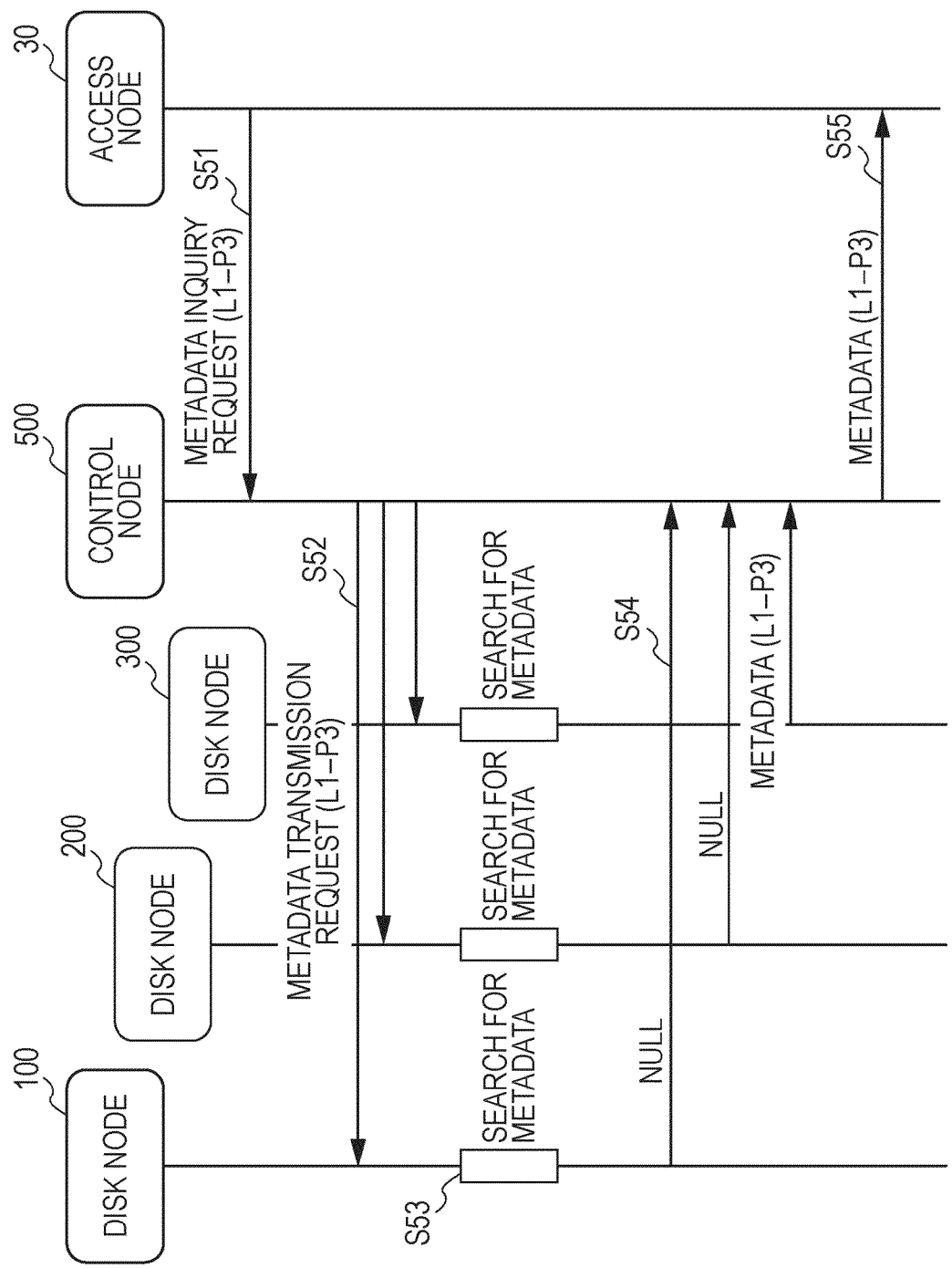
FIG. 17 is a sequence chart illustrating the procedures of the metadata inquiry process in the event of an access.

FIG. 17 is a sequence chart illustrating the procedures of the metadata inquiry process executed in the event of an access error. The process illustrated in FIG. 17 will be described below following the operation numbers.

[Operation S51] When an error occurs in access to the slice which is assigned to the segment of the logical disk, the logical disk access controller 31 of the access node 30 transmits the metadata inquiry request to the control node 500 along with designation of the address of the relevant segment.

The access error occurs, for example, if the disk node fails. In such a case, the failed disk node is disconnected from the multi-node storage system. This disables access to the primary slice which has been managed by the disconnected disk node. Accordingly, the secondary slice in pair with the primary slice, which cannot be accessed, is changed to the primary slice (namely, the slice type is changed to the primary slice).

An error occurs if the access node 30 accesses the disconnected disk node. At that time, the access node 30 transmits the metadata inquiry request to the control node 500 in order to obtain the metadata of the primary slice which is newly assigned to the access-target segment.

In the multi-node storage system, the slice assignment relation with respect to the logical disk is often reconstructed for the purpose of increasing the efficiency of the system operation. For example, when access frequency differs per slice, concentration of access on one disk node 100 can be prevented by distributing the slices having relatively high access frequencies to a plurality of disk nodes. When the slice assignment relation is reconstructed in such a manner, an error may occur if the access node 30 executes access based on the metadata obtained before the reconstruction. In that case, therefore, the access node 30 transmits the metadata inquiry request to the control node 500 in order to obtain the metadata of the primary slice which is assigned in accordance with the slice assignment relation after the reconstruction.

[Operation S52] Upon receiving the metadata inquiry request from the access node 30, the metadata inquiry controller 550 of the control node 500 transmits a metadata transmission request to each of the disk nodes 100, 200 and 300. The metadata transmission request includes the logical disk ID and the address of the segment, which have been denoted in the metadata inquiry request.

[Operation S53] The metadata search unit 141 of the disk node 100 executes a search for the metadata in response to the metadata transmission request. More specifically, the metadata search unit 141 searches for the metadata in the slice information storage 120 based on the logical product (AND) condition by using, as keywords, the logical disk ID and the address of the segment both denoted in the metadata transmission request and the type "P" (primary slice). As a result, the metadata of the slices can be detected, which are each assigned as the primary slice to the segment of the logical disk denoted by the logical disk ID, the segment having the designated address. Similarly, the metadata search process is executed in the disk nodes 200 and 300 as well. In an example of FIG. 17, the search is executed for the metadata of the primary slice assigned to the segment of the logical disk 60 (logical disk ID "L1"), which has the address "A3".

[Operation S54] The metadata search unit 141 obtains, from the slice information storage 120, the metadata for which the search has hit, and transmits the hit metadata to the control node 500. Similarly, the metadata for which the search has hit is transmitted from each of the disk nodes 200 and 300 to the control node 500. In the example of FIG. 17, there are no hit metadata in the disk nodes 100 and 200. Therefore, the metadata of the primary slice assigned to the third segment (having the address "A3") is transmitted only from the disk node 300.

[Operation S55] The metadata inquiry controller 550 of the control node 500 transfers the metadata, obtained from the disk nodes 100, 200 and 300, to the access node 30.

In such a manner, the access node 30 can obtain the latest metadata in the event of an error. Further, the access node 30 can change the disk node, which is the destination of the access, based on the latest metadata and can retry the access that has caused the error.

Additionally, when the metadata inquiry controller 550 obtains the metadata, it can store the obtained metadata in the slice assignment information storage 520.

FIG. 18 illustrates slice assignment information after the metadata inquiry process at the startup of the access node. The slice assignment information table 522 in the slice assignment information storage 520 registers therein the metadata regarding the primary slices that have the logical disk ID "L1". Thus, the metadata collected in response to the metadata inquiry request is registered in the slice assignment information storage 520. When the metadata inquiry request is issued later from the other access node 40, the metadata inquiry controller 550 obtains the metadata from the slice assignment information storage 520 and transmits the obtained metadata to the access node 40. As a result, the number of times of collecting the metadata can be reduced.

Transmission/reception of metadata in the dual-state recovery process will be described below. The dual-state recovery process is started when a degenerate segment has generated. The degenerate segment generates, for example, when the failed disk node is disconnected. Therefore, a process of disconnecting the failed disk node is described prior to describing the dual-state recovery process.

Figure 19:
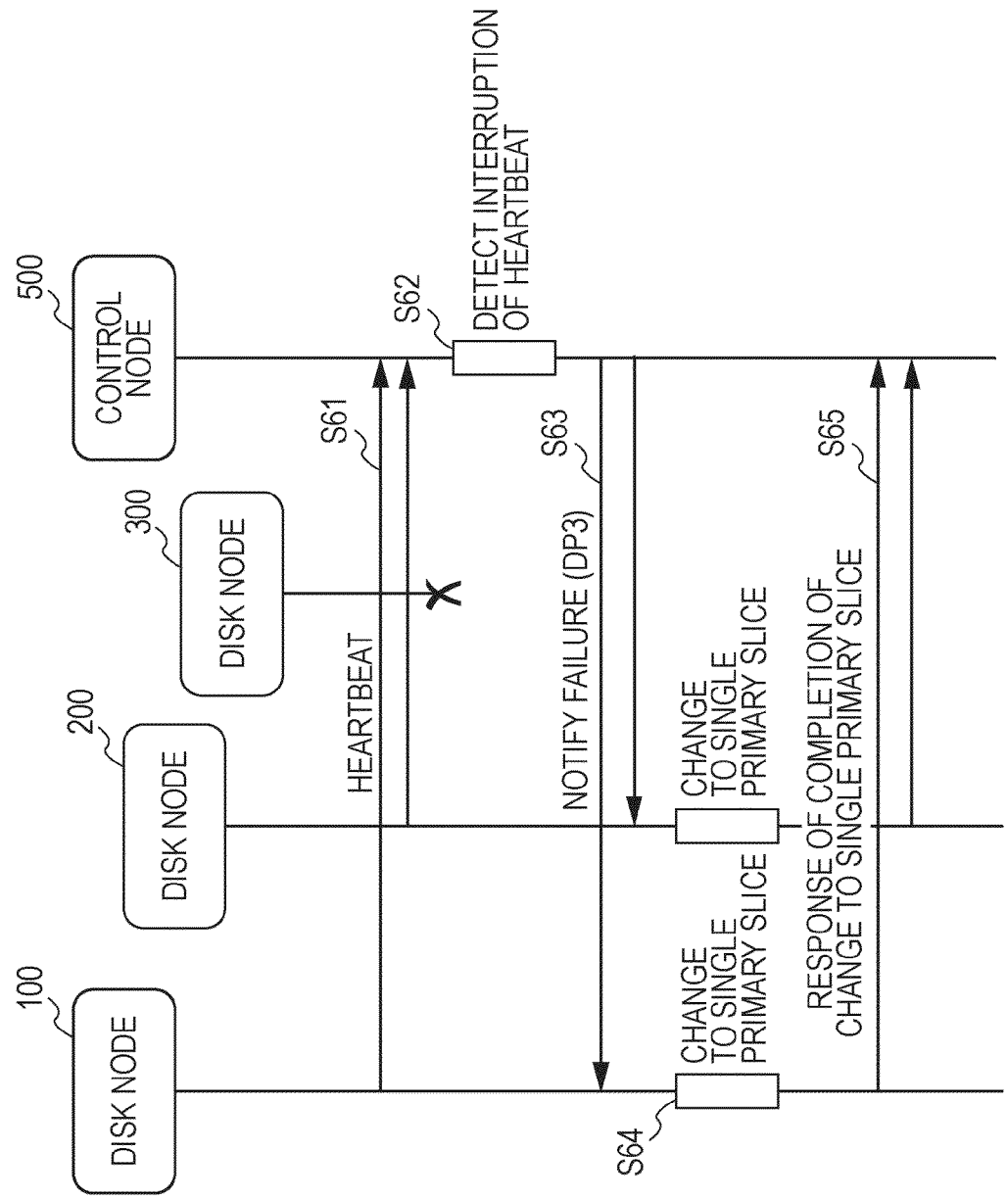
FIG. 19 is a sequence chart illustrating the procedures of a process for disconnecting the failed disk node.

FIG. 19 is a sequence chart illustrating the procedures of the process for disconnecting the failed disk node. The process illustrated in FIG. 19 will be described below following the operation numbers. It is here assumed that, in an example of FIG. 19, the disk node 300 has failed.

[Operation S61] The heartbeat transmitter 150 of the disk node 100 periodically transmits a heartbeat to the control node 500. Similarly, a heartbeat is periodically transmitted from the disk node 200 as well. However, transmission of a heartbeat from the failed disk node 300 is stopped (interrupted).

[Operation S62] The heartbeat monitor 560 of the control node 500 monitors whether the heartbeat periodically arrives from each of the disk nodes 100, 200 and 300. In an example of FIG. 19, the heartbeat monitor 560 detects the interruption of the heartbeat from the disk node 300. Then, the heartbeat monitor 560 notifies the disk node ID of the disk node, from which heartbeat has interrupted, to the recovery controller 570.

[Operation S63] The recovery controller 570 transmits a failure notice to the disk nodes 100 and 200 which are normally operating. The failure notice includes the disk node ID of the failed disk node 300. At that time, the recovery controller 570 deletes the number-of-slices information regarding the failed disk node, which is registered in the number-of-slices storage 510.

[Operation S64] The metadata updater 142 of the disk node 100 changes, to a single primary slice, the slice in pair with a slice in the disk node which is designated in the failure notice. More specifically, the metadata updater 142 searches the slice information storage 120 for the metadata for which the disk node ID denoted in the failure notice is set in the column of "mirror disk node ID". Further, the metadata updater 142 changes the type flag of the relevant metadata to the single primary slice "SP". In addition, the metadata updater 142 deletes the data in the columns of "mirror disk node ID" and "mirror slice ID", the data being included in the metadata for which the type flag has been changed to the single primary slice. Thereafter, the metadata updater 142 updates the metadata of the slice in the storage device 110, which is to be changed to the single primary slice, by using the metadata in the slice information storage 120 after the process for change to the single primary slice. A similar process for change to the single primary slice is executed in the disk node 200 as well.

For example, if the disk node 300 fails in the situation where the slice assignment to the segments is as per illustrated in FIG. 4, the slice 115a having been assigned as the primary slice to the first segment 61 is changed to the single primary slice in the disk node 100. Further, in the disk node 200, the slice 215b having been assigned as the secondary slice to the third segment 63 is changed to the single primary slice.

[Operation S65] After completion of the process for change to the single primary slice, the metadata updater 142 transmits, to the control node 500, a response of the completion of the change to the single primary slice. Similarly, the disk node 200 also transmits, to the control node 500, a response of the completion of the change to the single primary slice.

FIG. 20 illustrates metadata updated after the process for change to the single primary slice. As comparatively seen from FIG. 7, the second slice in the disk node 300 has been set (assigned) as the primary slice in pair with the slice (slice ID "SL1") at the head of the disk node 100. In the metadata table 121 in the slice information storage 120, therefore, the type of the slice, which has been changed to the single primary slice, is changed to "SP" and both the data having been set in the columns of "mirror disk node ID" and "mirror slice ID" are deleted as illustrated in FIG. 20.

After the process of disconnecting the failed disk node 300 is completed as described above, the recovery controller 570 of the control node 500 executes the dual-state recovery process.

Figure 21:
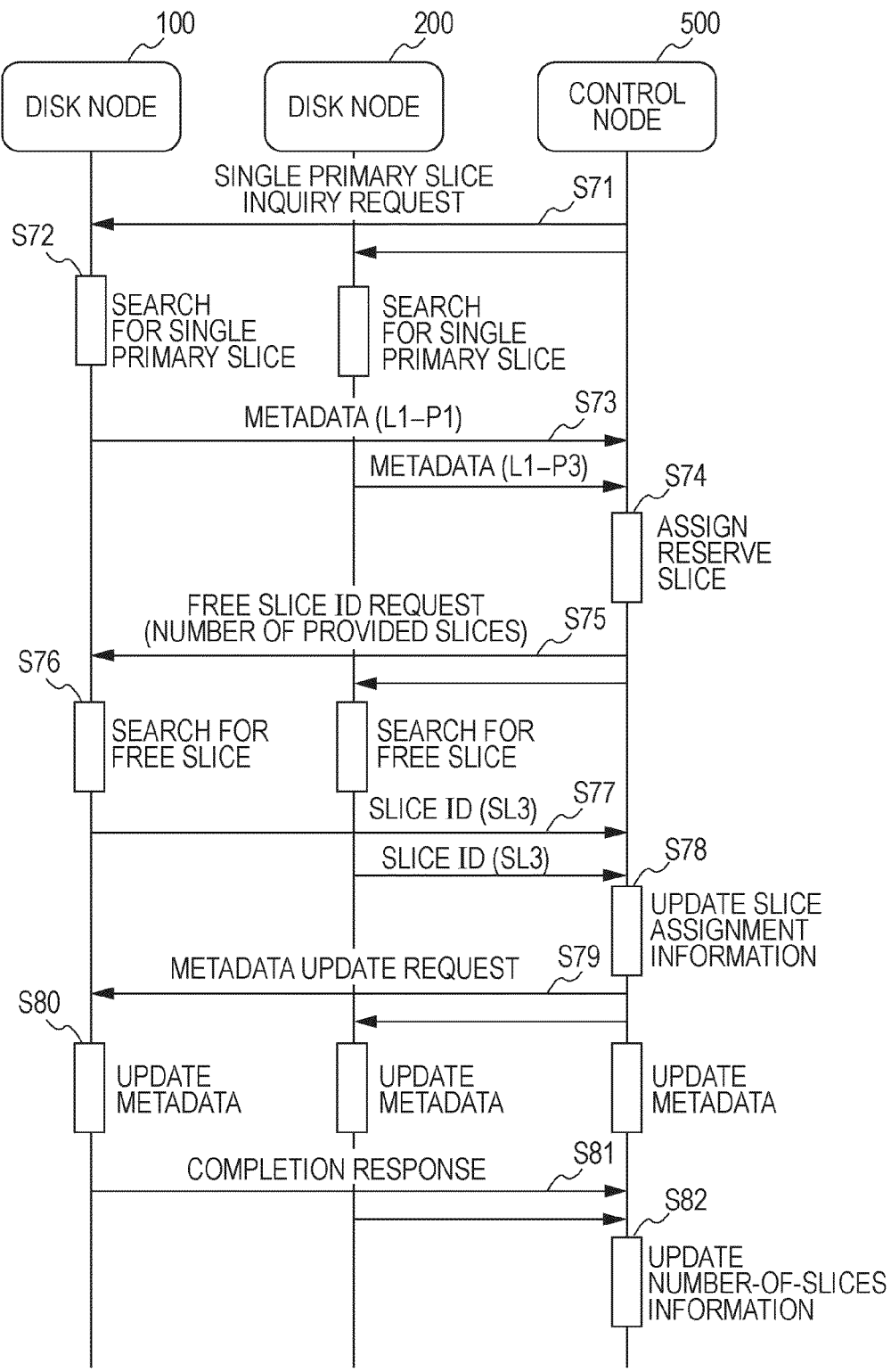
FIG. 21 is a sequence chart illustrating the procedures of a dual-state recovery process.

FIG. 21 is a sequence chart illustrating the procedures of the dual-state recovery process. The process illustrated in FIG. 21 will be described below following the operation numbers.

[Operation S71] The recovery controller 570 of the control node 500 transmits a request for a single primary slice inquiry to each of the disk nodes 100 and 200.

[Operation S72] In response to the request for the single primary slice inquiry, the metadata search unit 141 of the disk node 100 searches for the single primary slice in the slice information storage 120. More specifically, the metadata search unit 141 searches for the metadata registered in the slice information storage 120 with the slice type "SP" used as a keyword. Similarly, the single primary slice is searched for in the disk node 200 as well.

[Operation S73] The metadata search unit 141 transmits, to the control node 500, the metadata of the single primary slice for which the search has hit. Similarly, the metadata of the single primary slice for which the search has hit is also transmitted from the disk node 200 to the control node 500.

FIG. 22 illustrates the result of the single primary slice inquiry. In an example of FIG. 22, two sets of metadata of the first slice (slice ID "SL1") in the disk node 100 (disk node ID "DP1") and the second slice (slice ID "SL2") in the disk node 200 (disk node ID "DP2") are transmitted as the result of the single primary slice inquiry to the control node 500. The control node 500 can recognize, based on the result of the single primary slice inquiry, that the first segment 61 (having the address "A1") and the third segment 63 (having the address "A3") in the logical disk 60 (logical disk ID "L1") are degenerate segments.

Let now return to the description of FIG. 21.

[Operation S74] The recovery controller 570 of the control node 500 executes a reserve assignment process for the degenerate segment. More specifically, the recovery controller 570 determines which disk node provides the secondary slice to be assigned to the degenerate segment. At that time, the recovery controller 570 selects the disk node differing from the disk node that manages the single primary slice in the degenerate segment. Further, the recovery controller 570 refers to the number-of-slices storage 510 and sets the number of slices, which are provided from each of the disk nodes, to be equal to or smaller than the number free slices in the relevant disk node.

After the disk node providing the slice to the degenerate segment has been determined, the recovery controller 570 prepares a reserve assignment information table. The reserve assignment information table is stored in the slice assignment information storage 520.

FIG. 23 illustrates an exemplary data structure of the reserve assignment information table. A reserve assignment information table 523 has columns of "logical disk ID", "address", "type", "disk node ID", "slice ID", "mirror disk node ID", and "mirror slice ID". Details of information registered in the columns are the same as those registered in the columns having the same names as those in the metadata table 121, illustrated in FIG. 7, except for the columns of "slice ID" and "mirror slice ID". The reserve assignment information table 523 registers therein records regarding both the single primary slice and the slice (reserve slice) assigned as the secondary slice to the degenerate segment.

The column of "slice ID" is used to set the slice ID of the single primary slice when the record relates to the single primary slice, and it is used to set the temporary slice ID when the record relates to the reserve slice.

The column of "mirror slice ID" is used to set the temporary slice ID of the reserve slice that is to be paired with the single primary slice, when the record relates to the single primary slice, and it is used to set the slice ID of the slice that is to be paired with the reserve slice, when the record relates to the reserve slice.

Be it noted that the reserve assignment information table 523 is intermediate data for updating the slice assignment information. Therefore, the reserve assignment information table 523 is erased from the slice assignment information storage 520 when the slice assignment information table 522 is updated.

Let now return to the description of FIG. 21.

[Operation S75] The recovery controller 570 transmits a free slice ID request to each of the disk nodes 100 and 200. The free slice ID request includes the number of slices which are to be provided as reserve slices from each disk node.

[Operation S76] Upon receiving the free slice ID request, the metadata search unit 141 of the disk node 100 searches for the metadata of the free slice in the slice information storage 120. More specifically, the metadata search unit 141 searches the slice information storage 120 with the slice type flag "F" used as a keyword. Further, the metadata search unit 141 selects the metadata in number corresponding to the number of provided slices from among all the metadata for which the search has hit. Similarly, the free slice search process is executed in the disk node 200 as well.

[Operation S77] The metadata search unit 141 transmits the slice IDs of the selected metadata to the control node 500. Similarly, the slice IDs in number corresponding to the number of provided slices are also transmitted from the disk node 200 to the control node 500.

FIG. 24 illustrates the result of collecting the free slice IDs. In an example of FIG. 24, the slice ID "SL3" is transmitted from each of the disk nodes 100 and 200.

Let now return to the description of FIG. 21.

[Operation S78] The recovery controller 570 of the control node 500 updates the slice assignment information based on the slice IDs transmitted from the disk nodes 100 and 200. More specifically, the recovery controller 570 integrates the reserve assignment information table 523 and the result of collecting the free slice IDs into the slice assignment information table 522 within the slice assignment information storage 520.

FIG. 25 illustrates the slice assignment information table after update. In the slice assignment information table 522 of FIG. 25, the metadata of the slice having been changed to the single primary slice is updated and the metadata of the reserve slice is added.

For example, the slice having the disk node ID "DP1" and the slice ID "SL1" is the slice that has been changed to the single primary slice. In the column of "mirror disk node ID" for the metadata of that slice, the disk node ID "DP2" of the disk node 200 is set based on the reserve assignment information table 523. Also, in the column of "mirror slice ID" for the metadata of that slice, the slice ID "SL3" obtained from the disk node 200 is set based on the result of collecting the free slice IDs.

Further, the slice having the disk node ID "DP2" and the slice ID "SL3" is the reserve slice. The metadata of that slice is provided by copying the record registered in the reserve assignment information table 523 and by updating the contents of the column of "slice ID". In other words, the slice ID "SL3" obtained from the disk node 200 is set in the column of "slice ID" based on the result of collecting the free slice IDs.

Let now return to the description of FIG. 21.

[Operation S79] The recovery controller 570 of the control node 500 transmits a metadata update request to each of the disk nodes 100 and 200 based on the slice assignment information. The metadata update request includes the metadata of which contents have been updated in the processing of operation S78.

[Operation S80] The metadata updater 142 of the disk node 100 updates the metadata in both the slice information storage 120 and the storage device 110 in accordance with the metadata update request transmitted from the control node 500. Similarly, the metadata update process is executed in the disk node 200 as well.

[Operation S81] After completion of the update of the metadata, the metadata updater 142 transmits a completion response to the control node 500. Similarly, a completion response is also transmitted from the disk node 200 to the control node 500.

[Operation S82] Upon receiving the completion responses from the disk nodes 100 and 200, the slice assigner 540 of the control node 500 updates the number-of-slices information in the number-of-slices storage 510. More specifically, the slice assigner 540 subtracts, from the number of free slices in each of the disk nodes 100 and 200, the number of slices provided as the reserve slices by the relevant disk node.

Also, if there is one or more slices which have been changed from the secondary slice to the primary slice via the single primary slice, the slice assigner 540 adds the number of those changed slices to the number of primary slices in the disk node to which those changed slices belong. Simultaneously, the slice assigner 540 subtracts the number of those changed slices from the number of secondary slices.

Further, if one or more reserve slices are generated in each of the disk nodes 100 and 200, the slice assigner 540 adds the number of those generated slices to the number of reserve slices. As a result, the latest assignment state is reflected on the number-of-slices information in the number-of-slices storage 510.

When the mirroring unit 143 of the disk node 100 recognizes that the slice managed by the disk node 100 has been changed to the reserve slice through the metadata update process, the mirroring unit 143 requests slice data for the primary slice in pair with the slice that has been changed to the reserve slice. Further, the mirroring unit 143 stores the data obtained from the paired primary slice into the reserve slice. As a result, the dual state of data is recovered. After completion of copying of the data, the mirroring unit 143 notifies the completion of the data copying to the control node 500. In accordance with an instruction from the recovery controller 570 of the control node 500, the reserve slice is changed in type to the secondary slice.

Thus, an amount of transferred metadata can be reduced by managing the metadata by the disk nodes 100, 200 and 300 in a decentralized manner and by transmitting the metadata to the control node 500 as required. Such an effect in reducing the amount of transferred metadata becomes more significant as the number of disk nodes increases.

FIG. 26 illustrates the result of comparing the amounts of transferred metadata between different metadata management methods. The result of FIG. 26 represents, by way of example, the case where the number of disk nodes is "100", the storage capacity per storage device is "10 TB (terabit)", the slice size is "1 GB (gigabyte)", and the size of the logical disk is "2 TB".

In that case, 10000 slices are provided per disk node. Also, the logical disk is made up of 2000 segments. The comparison is made between different metadata management methods, i.e., between when metadata is managed in a centralized manner by using the control node and when metadata is managed in a decentralized manner by using the disk nodes as in the above-described embodiment.

(Startup/Failover Process of Control Node)

In the centralized management method, the metadata of all the disk nodes are transferred to the control node. On the other hand, in the decentralized management method, only the number-of-slices information is transferred to the control node from each disk node. In this example, one item of number-of-slices information is regarded as corresponding to one metadata. As a result, the amount of transferred metadata can be reduced to $1/10000$ by executing the decentralized management.

(Logical Disk Preparation Process)

In the centralized management method, because the metadata is transmitted to each disk node from the control node 500, the metadata is transmitted in number (2000) corresponding to the number of segments (twice the number of segments when data is stored in the dual state). On the other hand, in the decentralized management method, the control node collects the free slice IDs (corresponding to the metadata in number 2000) from the individual disk nodes, and then transmits the metadata (in number 2000) to the individual disk nodes. Therefore, the metadata is transferred twice the number of segments (more twice, i.e., quadruple, the number of segments when data is stored in the dual state). This calculation shows that the number of transferred metadata is doubled by the decentralized management method. In the example described here, however, one slice ID is regarded as corresponding to one metadata for simpler calculation, and the number of data transferred in the decentralized management method is relatively overly estimated. In practice, one slice ID can be transmitted in a smaller data amount than one metadata.

(Logical Disk Deletion Process)

In the centralized management method, the metadata is transmitted to the individual disk nodes from the control node 500 in number corresponding to the number of segments (twice the number of segments when data is stored in the dual state) for transmitting the updated metadata of the slices that have been assigned to the deleted logical disk. On the other hand, in the decentralized management method, the number of transferred data is only the number of the disk nodes because it is just required to notify the logical disk ID of the deleted logical disk to the individual disk nodes. Accordingly, the amount of transferred metadata can be reduced to $1/20$ by employing the decentralized management method.

(Dual-State Recovery Process)

Assume here that, in a state where all the slices of one disk node are assigned to the segments of the logical disks, the relevant disk node undergoes a failure. In the centralized management method, the control node collects all the metadata (in number 990000) from the other operating disk nodes (in number 99) and determines which segments are degenerate segments. Then, the control node transmits, to the operating disk nodes, both the metadata (in number 10000) of the slices that are changed to the single primary slices and the metadata (in number 10000) of the reserve slices. On the other hand, in the decentralized management method, by transmitting (e.g., multicasting as one practicable way) the disk node ID of the failed disk node from the control node to the other disk nodes, the process for change to the single primary slice is executed in each of the other disk nodes. Thereafter, the control node collects the metadata (in number 10000) of the single primary slices from the other disk nodes and determines which segments are degenerate segments. Further, the control node collects the slice IDs (corresponding to the metadata in number 10000) of the free slices from the other disk nodes. Then, the control node transmits, to the other disk nodes, both the metadata of the primary slices (to update the information of the paired slices) and the metadata of the reserve slices (i.e., the metadata in number 20000 in total). Accordingly, the amount of transferred metadata can be reduced to about $1/25$ by employing the decentralized management method.

Thus, the amount of transferred metadata is reduced by using the decentralized management method except for the logical disk preparation process. Further, the logical disk preparation process is not so frequently generated, and the number of transferred metadata is increased just 2000 with the logical disk preparation process. In consideration of such a result, it is apparent that the amount of metadata transferred during the operation of the multi-node storage system is drastically reduced by shifting the metadata management method from the centralized management method to the decentralized management method.

Further, since the search process for metadata is executed in each of the disk nodes 100, 200 and 300, the load of the search process is distributed to the disk nodes 100, 200 and 300. As a result, the search process in the metadata inquiry, etc. can be executed at a high rate even in a system having a larger scale.

Still further, by employing the decentralized management method, the number of metadata transferred in an urgent case, such as the failover process and the dual-state recovery state, is reduced, whereby the system can be more quickly recovered from the failure. This is effective in improving system reliability (i.e., quicker recovery to the dual state) and cutting a period during which the functions are restricted (i.e., the completion of failover in a shorter time).

Moreover, in the multi-node storage system described as the embodiment, even if failover of the control node occurs, service to users is not impaired unless the access node generates the metadata inquiry request during the failover process.

In addition, since the metadata is all managed in the disk nodes 100, 200 and 300, the load imposed on the control node 500 is reduced, thus enabling the system to be operated in such a manner that the resident control node is no longer required and the functions of the control node are started up only as the occasion requires.

According to the technique disclosed herein, the slice assignment information is managed by the control node and the disk nodes in a decentralized manner, and the amount of transferred information regarding the slice state is reduced.

The above-described processing functions can be realized with a computer. In that case, programs are provided which describe details of the processing functions to be executed by the control node 500 and the disk nodes 100, 200 and 300. By causing the computer to execute the programs, the above-described processing functions are realized on the computer. The programs describing the details of the processing functions can be recorded on a computer-readable recording medium. The computer-readable recording medium includes, for example, a magnetic recording device, an optical disk, a magneto-optical recording medium, and a semiconductor memory. The magnetic recording device includes, for example, a hard disk drive (HDD), a flexible disk (FD), and a magnetic tape. The optical disk includes, for example, a DVD (Digital Versatile Disc), a DVD-RAM, a CD-ROM (Compact Disc Read Only Memory), and a CD-R (Recordable)/RW (ReWritable). The magneto-optical recording medium includes, for example, an MO (Magneto-Optical disc).

When the programs are circulated on markets, for example, a portable recording medium, such as a DVD or a CD-ROM, recording the programs is commercialized for sale. The programs can also be circulated by storing the programs in a memory of a server computer, and by transferring the stored programs from the server computer to other computers via a network.

The computer for executing the programs stores the programs recorded on the portable recording medium or the programs transferred from the server computer in its own memory, for example. The computer reads the programs from its own memory and executes processing in accordance with the programs. Alternatively, the computer can execute processing in accordance with the programs by directly reading the programs from the portable recording medium. The computer may also execute processing in such a way that, whenever part of the programs is transferred from the server computer, the computer executes processing in accordance with the received program.

Be it noted that the present invention is not limited to the above-described embodiment and can be variously modified without departing from the gist of the present invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer-readable recording medium encoded with a decentralized data control program containing instructions executable on a computer, the computer executing a process of assigning storage areas of storage devices, which are connected respectively to a plurality of disk nodes, to storage areas of a virtually defined logical disk, the program causing the computer to execute:

a number-of-slices collection procedure of collecting number-of-slices information indicating the number of free slices, which are not assigned to the storage areas of the logical disk, from each of the plural disk nodes, which divides the storage area of the corresponding storage device in units of slice and which stores an assignment relation of the slices with respect to the storage areas of the logical disk, and storing the collected number-of-slices information in a number-of-slices storage;

a disk node selection procedure of, when a process requiring slice assignment to the storage areas of the logical disk generates, referring to the number-of-slices storage, selecting a source disk node from among the disk nodes having the free slices, which serves as a source providing the slice to be assigned, and requesting a slice identifier to identify the free slice for the selected source disk node;

a slice assignment procedure of receiving the slice identifier from the source disk node, determining an assignment relation of the free slice, which is denoted by the received slice identifier, with respect to the storage areas of the logical disk, and reporting the determined assignment relation to the source disk node; and a number-of-slices update procedure of subtracting the number of one or more slice identifiers, which have been transmitted from the source disk node, from the number of the free slices in the source disk node, which is stored in the number-of-slices storage.

2. A computer-readable recording medium encoded with a storage management program containing instructions executable on a computer, the computer executing a process of dividing a storage area of a storage device in units of slice and managing the slices, the program causing the computer to execute:

a number-of-slices counting procedure of referring to a slice assignment information storage which stores slice assignment information indicating an assignment relation of the slices with respect to storage areas of a virtually defined logical disk, counting the number of free slices not assigned to the storage areas of the logical disk, and transmitting number-of-slices information indicating the number of the free slices to a control node which executes a process of assigning the slices to the storage areas of the logical disk;

a slice identifier transmission procedure of transmitting a slice identifier for identifying each of the free slices to the control node in response to a request from the control node; and an assignment information update procedure of, when the assignment relation of the slices with respect to the storage areas of the logical disk is notified from the control node, updating the slice assignment information based on the notified assignment relation, wherein:

when the slices assigned to the storage areas of the logical disk are mirrored, the slice assignment information in the slice assignment information storage contains information indicating the disk node which stores a counterpart slice in pair with each of the mirrored slices, and when a notice indicating a failure of the disk node storing the counterpart slice is notified from the control node, the assignment information update procedure sets a degenerate flag indicating that a mirroring environment is impaired.

3. The computer-readable recording medium according to claim 2, the program further causing the computer to execute:

a search procedure of, when a request of inquiring the slice for which the mirroring environment is impaired is received from the control node, searching the slice assignment information storage for the slice to which the degenerate flag is set, and transmitting a slice identifier of the slice to which the degenerate flag is set to the control node.

* * * * *